(12) United States Patent
Chen

(10) Patent No.: US 10,500,989 B2
(45) Date of Patent: Dec. 10, 2019

(54) CHILD CAR SEAT AND SAFETY BELT GUIDING APPARATUS THEREOF

(71) Applicant: Wonderland Switzerland AG, Steinhausen (CH)

(72) Inventor: Ruibin Chen, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/979,481

(22) Filed: May 15, 2018

(65) Prior Publication Data
US 2019/0054844 A1 Feb. 21, 2019

(30) Foreign Application Priority Data

Aug. 18, 2017 (CN) .......................... 2017 1 0712961
Nov. 17, 2017 (CN) .......................... 2017 1 1145500

(51) Int. Cl.
*B60N 2/28* (2006.01)
(52) U.S. Cl.
CPC ......... *B60N 2/2875* (2013.01); *B60N 2/2806* (2013.01); *B60N 2/2812* (2013.01); *B60N 2/2821* (2013.01); *B60N 2/2845* (2013.01)
(58) Field of Classification Search
CPC .. B60N 2/2806; B60N 2/2875; B60N 2/2821; B60N 2/2812; B60N 2/2845
USPC ......................................... 297/256.14, 250.1
See application file for complete search history.

(56) References Cited

U.S. PATENT DOCUMENTS

| 5,052,749 | A | * | 10/1991 | Groenendijk | ........ | B60N 2/2821 |
| | | | | | | 297/256.13 |
| 6,048,028 | A | | 4/2000 | Bapst | | |
| 6,126,234 | A | * | 10/2000 | Cabagnero | ............. | A47D 13/02 |
| | | | | | | 297/250.1 |
| 2004/0075317 | A1 | * | 4/2004 | Yoshida | ............... | B60N 2/2806 |
| | | | | | | 297/250.1 |
| 2011/0148160 | A1 | | 6/2011 | Meeker | | |

FOREIGN PATENT DOCUMENTS

| CN | 104875638 B | 6/2017 |
| EP | 2 865 561 A1 | 4/2015 |

* cited by examiner

*Primary Examiner* — Milton Nelson, Jr.
(74) *Attorney, Agent, or Firm* — Winston Hsu

(57) ABSTRACT

A safety belt guiding apparatus and a child car seat are disclosed, the latter includes a seat shell with a holder and thereon a backrest section and a seat section movably disposed. The seat section and the backrest section are pivoted to each other thereby allowing the seat shell at least two using positions. A safety belt guiding apparatus assembled to the holder includes a safety belt director and a linking assembly with one end of it linked to the backrest section or the seat section and another to the safety belt director. During a switch among using positions, the backrest section or the seat section selectively drives the safety belt director to pop out of or retract to the holder, where a safety belt selectively passes through the safety belt director to fasten the seat shell, alone or base-assembled, to a car seat, thereby providing versatility.

38 Claims, 29 Drawing Sheets

CHILD CAR SEAT AND SAFETY BELT GUIDING APPARATUS THEREOF

BACKGROUND OF THE INVENTION

1. Field of the Invention

The invention relates to a child apparatus, and more particularly, to a child car seat and a safety belt guiding apparatus of the child car seat.

2. Description of the Prior Art

Economic development and technology progress have provided abundant consumer goods for people and child car seats are one of the various kinds of them.

As we all know, a child car seat is a kind of infant products particularly developed for children by corporations. With utilization of the child car seat, children are kept safe and away from injuries caused by sudden brakes or car crash, and this is why the child car seats are greatly embraced and are increasingly popularized.

At present, a child car seat of prior art includes a base and a seat shell selectively assembled to or detached from the base. The seat shell includes a holder along with a backrest section and a seat section movably disposed to the holder, where the seat section and the backrest section are pivoted to each other. When the child car seat is to be installed to the car seat, the safety belt of the car seat is needed to assist fastening the base so as to reliably fix the child car seat on the car seat.

However, the seat shell of the current child car seat is not allowed to be independently and securely fastened to the car seat without being assembled or incorporated with the base in advance. This is because the child car seat of the prior art can only be fixed to the car seat by fastening the safety belt of the car seat to the base, which the seat shell should be assembled to. Not being able to fasten the seat belt directly to the seat shell explains the monotony of the fashion of use for today's child car seats.

Therefore, a child car seat and a safety belt guiding apparatus with multiple configurations of use are needed to overcome the drawbacks mentioned above.

SUMMARY OF THE INVENTION

An objective of the invention is to provide a safety belt guiding apparatus with multiple configurations of use.

Another objective of the invention is to provide a child car seat with multiple configurations of use.

To accomplish the objectives above, a safety belt guiding apparatus disposed to a child car seat is provided. The child car seat at least includes a seat shell, which includes a holder as well as a back rest section and a seat section movably disposed to the holder. The seat section and the back rest section are pivoted to each other so that the seat shell is configurable to at least two using positions. The safety belt guiding apparatus in the invention includes a safety belt director and a linking assembly assembled to the holder, with one end of the linking assembly linked to the backrest section or the seat section and another end of the linking assembly linked to the safety belt director. In the process of the seat shell converting among different using position, the backrest section or the seat section selectively drives, through the linking assembly, the safety belt director to move to a first position or a second position with respect to the holder, where a safety belt selectively passing through the safety belt director at the first position fastens the stand-alone seat shell or the seat shell assembled with a base to a car seat.

Preferably, the safety belt guiding apparatus pops out of the holder to the first position when the seat shell is configured to a most upright using position and the safety belt guiding apparatus retracts to the holder to the second position when the seat shell is configured to the rest using positions.

Preferably, a guiding structure guiding the relative pivoting between the seat section and the backrest section is disposed between the holder and the seat section or between the holder and the backrest section, where the guiding structure is linked with the linking assembly. The backrest section or the seat section selectively drives, through the linking assembly, the safety belt director to pop out of the holder to the first position or to retract to the holder to the second position.

Preferably, the guiding structure includes a guide slot, positioned at a side wall of the holder, and a guide post, positioned at a side wall of the seat section, where the side wall of the holder faces the side wall of the seat section, the linking assembly is linked with the guide post, and the guide post slides along the guide slot during the process of the relative pivoting between the seat section and the backrest section.

Preferably, the linking assembly includes a linking member, pivoted to the holder, and a driving member, movably disposed at the holder and selectively driving the safety belt director to pop out of the holder to the first position, where one end of the linking member is linked with the guide post and another end of the linking member is linked with the driving member.

Preferably, apart from the driving member being slidably disposed to the holder, one of the driving member and the linking member includes a linking slot or a linking elongated hole, and the other one of the driving member and the linking member includes a linking lump extending into the linking slot or the linking elongated hole and sliding therein.

Preferably, the linking slot or the linking elongated hole is deployed along a longitudinal direction of the linking member.

Preferably, the linking slot or the linking elongated hole is in a curved shape, and the linking lump is a column structure.

Preferably, the driving member includes a pushing section adapted to push against the safety belt director, where in the process of the driving member sliding relatively to the holder, the pushing section selectively pushed the safety belt director to pop out of the holder to the first position, where a popped-out direction of the safety belt director intersects with a sliding direction of the driving member.

Preferably, the popped-out direction of the safety belt director is oriented along a left-to-right direction of the holder.

Preferably, the pushing section includes a pushing bevel inclined outward along a direction where the driving member slides near the safety belt director.

Preferably, the safety belt guiding apparatus in the invention also includes a resilient restoring component linked between the safety belt director and the holder, where the resilient restoring component bears the potential to drive the popped-out safety belt director at the first position to retract to the holder to the second position.

Preferably, the safety belt director includes an anchoring portion inbuilt in the holder and an on-lay portion positioned outside of the holder and assembled to the anchoring portion. The resilient restoring component is deployed along a popped-out direction of the safety belt director, with one end of the resilient restoring component abutting against the anchoring portion and another end of the resilient restoring component abutting against a portion of the holder in between the anchoring portion and the on-lay portion.

Preferably, the driving member includes gear regulating marks respectively corresponding to one of the using positions of the seat shell and the holder includes a peephole aligning with one of the gear regulating marks.

Preferably, the safety belt guiding apparatus of the invention is installed to the left side wall and the right side wall of the holder.

Preferably, the safety belt guiding apparatus of the invention includes a blocker movably disposed to the holder and a safety belt guiding passage disposed to the holder and threaded by the safety belt. An opening is formed at the safety belt guiding passage for the safety belt to pass therethrough. The linking assembly is disposed to the backrest section or the seat section and linked with the blocker. The blocker is driven by the backrest section or the seat section via the linking assembly to selectively shift between the configurations of blocking and unblocking the opening when the seat shell varies among various using positions.

Preferably, the blocker is laid across the safety belt guiding passage to block the opening and is removed from the safety belt guiding passage to unblock the opening.

Preferably, the blocker moving to the second position is laid across the safety belt guiding passage when popping out of the holder. The blocker moving to the first position is removed from the safety belt guiding passage to unblock the opening when retracting into the holder.

Preferably, the blocker moving to the first position is removed from the safety belt guiding passage to unblock the opening when the seat shell is configured to a most upright using position. The blocker moving to the second position is laid across the safety belt guiding passage when the seat shell is configured to any of the using positions other than the most upright using position.

Preferably, the blocker includes a bearing portion and an inclined transitional portion inclined relative to the bearing portion. The blocker is driven by the linking assembly to shift between the configurations of blocking and unblocking the opening as the linking assembly slides between the inclined transitional portion and the bearing portion.

Preferably, the safety belt guiding apparatus of the invention further includes a first elastic component bearing constant potential of driving the blocker to block the opening or to unblock the opening.

Preferably, the safety belt guiding apparatus of the invention further includes a fixer disposed within the holder. The safety belt guiding passage is positioned on the fixer. The first elastic component is linked between the blocker and the fixer or linked between the blocker and the holder.

Preferably, a first guiding structure guiding the relative pivoting between the seat section and the backrest section is disposed between the holder and at least one of the seat section and the backrest section. The linking assembly is formed on the first guiding structure.

Preferably, the first guiding structure includes a first guide slot and a first guide post. The first guide slot is positioned on a side wall of the holder. The first guide post is positioned on a side wall of at least one of the seat section and the backrest section and sliding along the first guide slot. The linking assembly is positioned on the first guide post. The side wall of at least one of the seat section and the backrest section faces the side wall of the holder.

Preferably, the first guide post is a column structure.

Preferably, the safety belt guiding passage is positioned on the side wall of the holder. The opening at the safety belt guiding passage is deployed upwards. The blocker is slidably disposed to the side wall of the holder along a front to rear direction of the holder. The guiding slot is deployed along a top to bottom direction of the holder.

Preferably, a second elastic component is linked between the side wall of the holder and one of the linking assembly and the first guiding structure.

Preferably, a second guiding structure guiding the relative pivoting between the seat section and the backrest section is disposed between the holder and at least one of the seat section and the backrest section.

Preferably, the second guiding structure includes a second guide slot and a second guide post. The second guide slot is positioned on the side wall of the holder. The second guide post is positioned on the side wall of at least one of the backrest section and the seat section. The second guide post extends into the second guide slot.

Preferably, a third guiding structure guiding the relative pivoting between the seat section and the backrest section is disposed between the holder and at least one of the seat section and the backrest section. A gear regulation marks structure is disposed on the side wall of the holder and linked with the third guiding structure. The gear regulation marks structure respectively corresponds to the using positions of the seat shell.

Preferably, the third guiding structure includes a third guide slot and a third guide post. The third guide slot is positioned on the side wall of the holder. The third guide post is positioned on the side wall of at least one of the backrest section and the seat section. The third guide post extends into the third guide slot. The third guide post is linked with the gear regulation marks structure.

To accomplish the objectives above, the child car seat of the invention at least includes the safety belt guiding apparatus and the seat shell mentioned above. The seat shell includes a holder as well as a backrest section and a seat section movably disposed to the holder. The holder and the backrest section are pivoted to each other where the seat shell is configurable to at least two using positions due to relative pivoting between the seat section and the backrest section.

Compared with prior arts, the safety belt guiding apparatus in the invention includes the safety belt director and the linking assembly assembled to the holder. One end of the linking assembly is linked with the backrest section or the seat section, and the other end of the linking assembly is linked with the safety belt director. In the process of the seat shell varying among various using positions, the backrest section or the seat section selectively drives, through the linking assembly, the safety belt director to move to a first position or a second position with respect to the holder so that the seat belt may selectively pass through the safety belt director at the first position to fasten the stand-alone seat shell or the seat shell incorporated with the base to the car seat. Therefore, when the safety belt director on the seat shell is driven to move to the first position with respect to the holder by the backrest section or the seat section through the linking assembly, the seat shell may be, through the car safety belt passing through the safety belt director, fastened to the car seat along without the base, or incorporated with the base first before fastened to the car seat. The child car seat provided in the invention therefore comes with versatility and agility in various using modes.

These and other objectives of the present invention will no doubt become obvious to those of ordinary skill in the art after reading the following detailed description of the preferred embodiment that is illustrated in the various figures and drawings.

DETAILED DESCRIPTION

Please refer to the figures for illustration of the embodiments of the invention, where similar component marks represent similar components.

Figure 1:
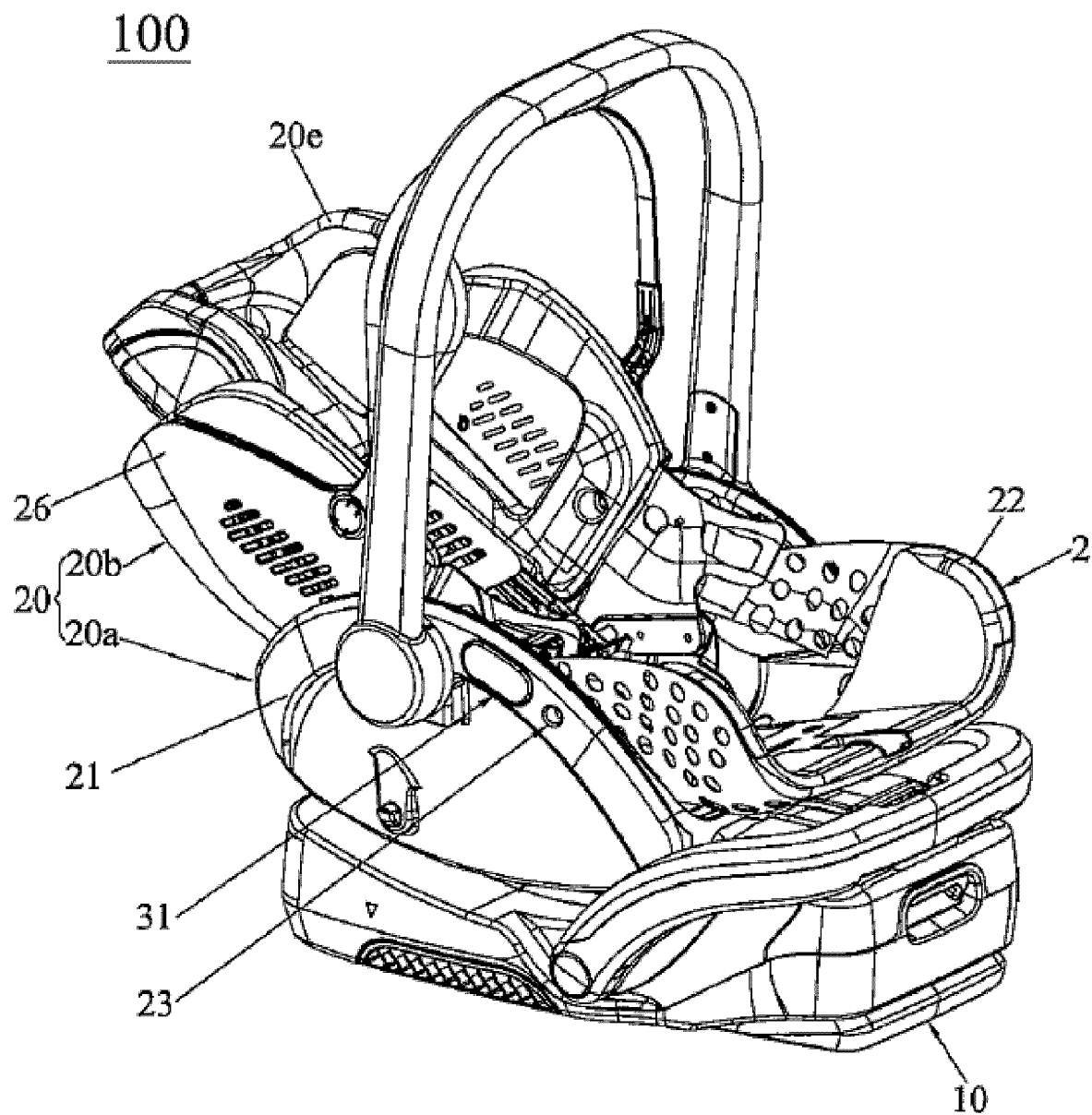
FIG. 1 is a schematic diagram showing a perspective view of a seat shell of a child car seat incorporated with a base in the invention.
Figure 3:
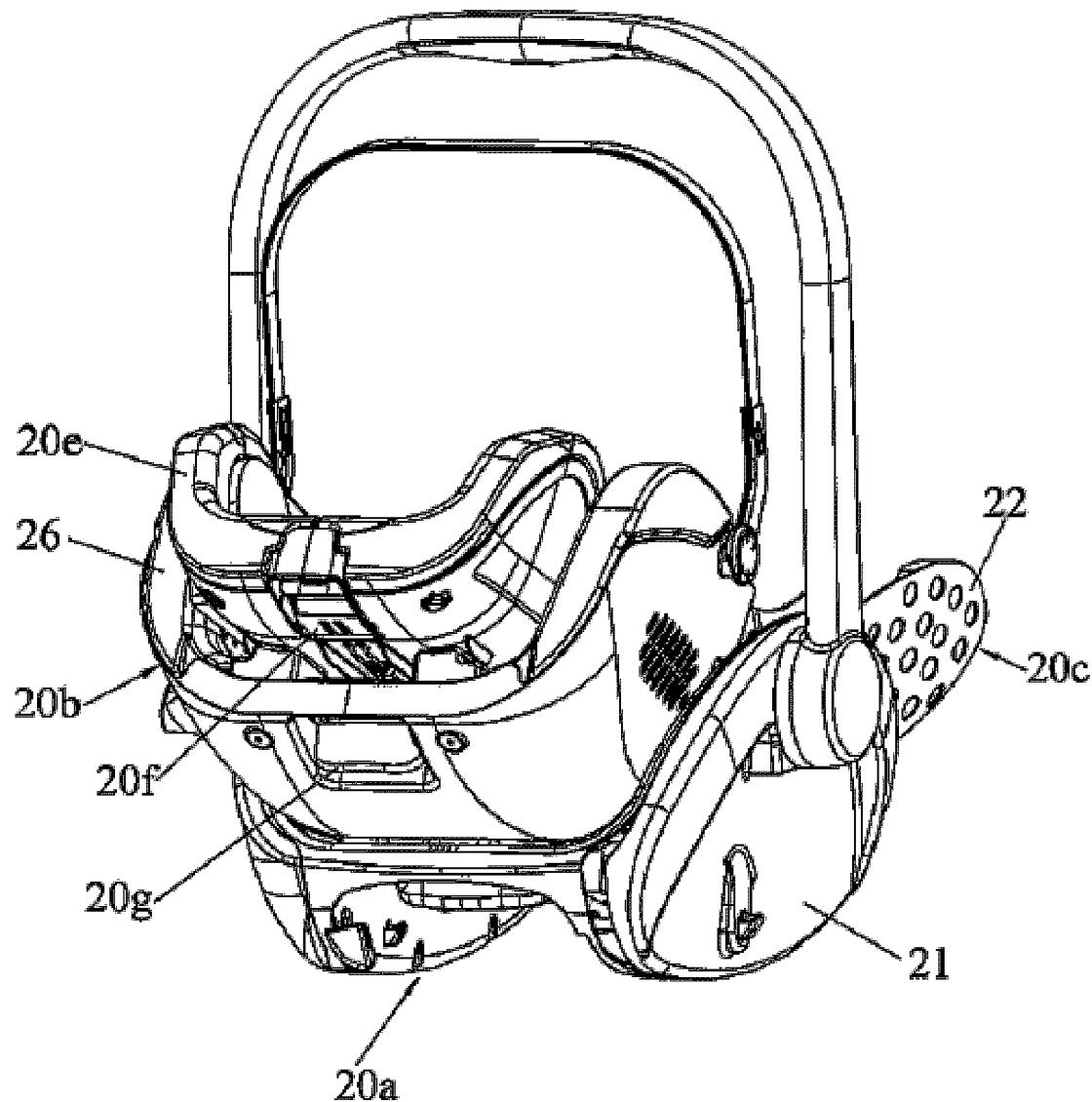
FIG. 3 is a schematic diagram showing another perspective view of the seat shell shown in FIG. 2.
Figure 4:
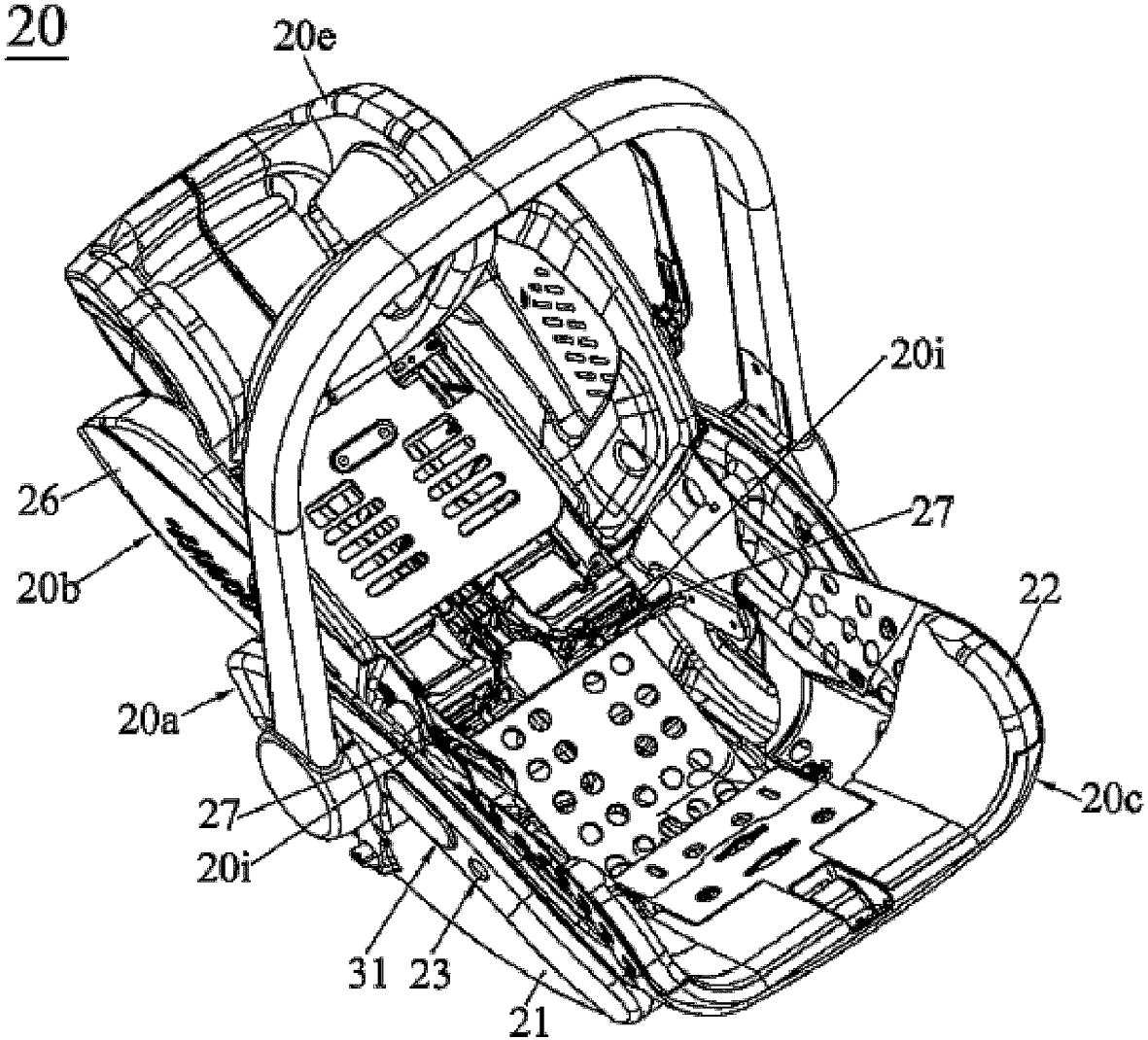
FIG. 4 is a schematic diagram showing still another perspective view of the seat shell shown in FIG. 2.
Figure 5:
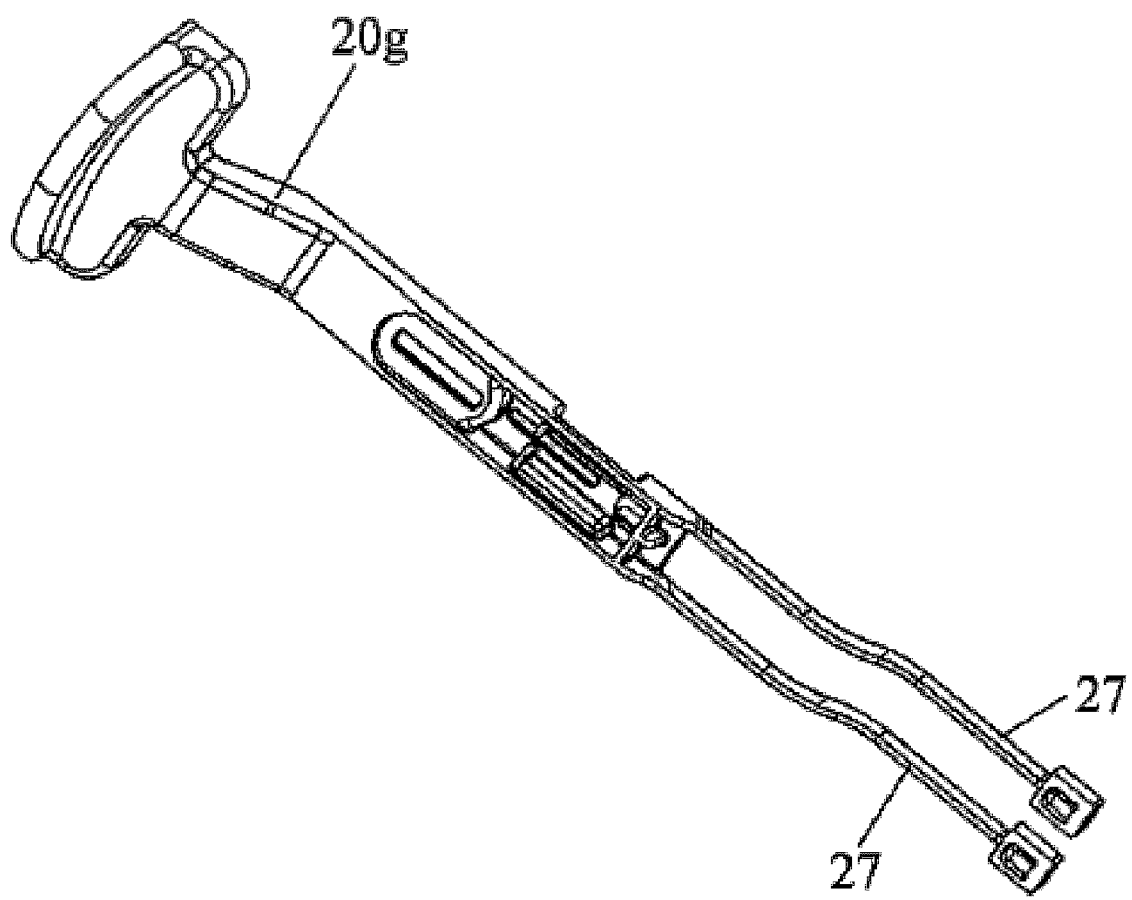
FIG. 5 is a schematic diagram showing a perspective view of a backrest actuator, used to adjust the angle of a backrest section, in the seat shell.

Please refer to FIG. 1. A child car seat 100 in the current invention includes a base 10, a seat shell 20 selectively assembled to or removed from the base 10, and a safety belt guiding apparatus 30 (see FIG. 19). The seat shell 20 is adapted to be assembled to the base 10 as a combination or be removed from the base 10 when used separately, according to the usage need. The seat shell 20 includes a holder 20a along with a backrest section 20b and a seat section 20c movably disposed to the holder 20a. As shown in FIG. 3, in order for the seat shell 20 to better fit a child, a headrest section 20e with adjustable position is further disposed to the backrest section 20b and a headrest adjustment mechanism 20f is further disposed to the headrest section 20e to adjust the headrest section 20e. The seat section 20c and the backrest section 20b are pivoted to each other in such a way that the seat shell 20 is configurable to three using positions due to relative pivoting between the seat section 20c and the backrest section 20b. Apparently, in other embodiments, the seat shell 20 may also be configurable to two, four, or five using positions due to relative pivoting between the seat section 20c and the backrest section 20b, so the number of configurations is not limited thereof. For the convenience of description, the three using positions of the seat shell 20 are each designated as a most reclining position, a transitional position, and a most upright position, respectively in correspondence to the statuses illustrated in FIG. 6 to FIG. 8 or FIG. 9 to FIG. 11. As shown in FIG. 4 and FIG. 9 to FIG. 11, in order to maintain the status of the backrest section 20b pivoting with respect to the seat section 20c to the most reclining position, the transitional position, or the most upright position, locking pins 20i are slidably disposed at a left side wall 26 and a right side wall 26 of the backrest section 20b and correspondingly three locking holes 211 are intermittently disposed at each of a left side wall 21 and a right side wall 21 of the holder 20a. When the locking pin 20i is engaged with one of the locking holes 211, the seat shell 20 is configurable to the most reclining position, the transitional position, or the most upright position correspondingly. As shown in FIG. 3, in order to release the locking pin 20i, a backrest actuator 20g, whose perspective view is shown in FIG. 5 for reference, is also disposed to the rear of the backrest section 20b. With connecting legs 27 of the backrest actuator 20g linked with the locking pins 20i, when a user operates the backrest actuator 20g, the locking pins 20i are driven by the backrest actuator 20g to be disengaged from the locking holes 211 so that the seat shell 20 at the most reclining position, the transitional position, or the most upright position may be released and configured interchangeably among the three of the most reclining position, the transitional position, or the most upright position. As shown in FIGS. 9, 10, 11, 12, 14, and 16, in order for the manipulation of relative pivoting between the seat section 20c and the backrest section 20b to be more stable and reliable, guiding structures 20d are disposed in between the holder 20a and the seat section 20c and in between the holder 20a and the backrest section 20b to guide the relative pivoting between the seat section 20c and the backrest section 20b. Specifically, in the embodiments of the invention, the guiding structure 20d includes a guide slot 25 and a guide post 24. The guide slot 25 is positioned at a front end and a rear end of the side walls 21 of the holder 20a and the guide post 24 is positioned at the side walls 26 of the backrest section 20b and at the side walls 22 of the seat section 20c, where the side walls 22 of the seat section 20c face the side walls 21 of the holder 20a. Please be noted that instead of being disposed both in between the holder 20a and the seat section 20c and in between the holder 20a and the backrest section 20b, the guiding structure 20d is fully functional disposed in either way. For specific structures and interaction among the guiding structures 20d, the holder 20a, and the seat section 20c, specific structures and interaction among the backrest actuator 20g, the locking pins 20i, and the locking holes 211, and specific structures and interaction between the seat section 20c and the backrest section 20b, please refer to the patent application with PRC patent number 201510757603.0, and the details is not to be described here.

Figure 9:
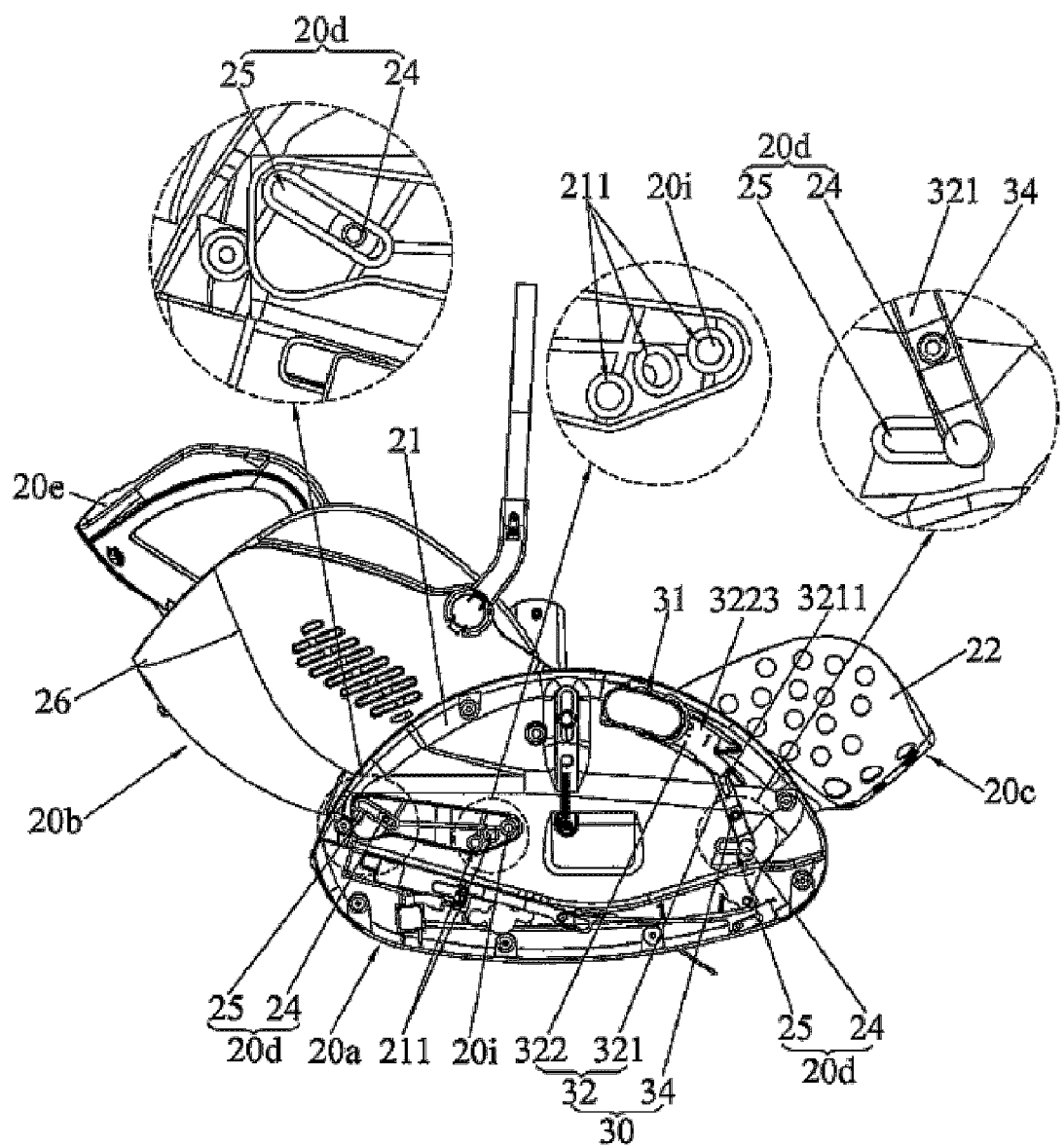
FIG. 9 is a schematic diagram of a side infrastructural view of partial structures hidden in a right side wall of a holder of the seat shell configured at the status shown in FIG. 6.
Figure 10:
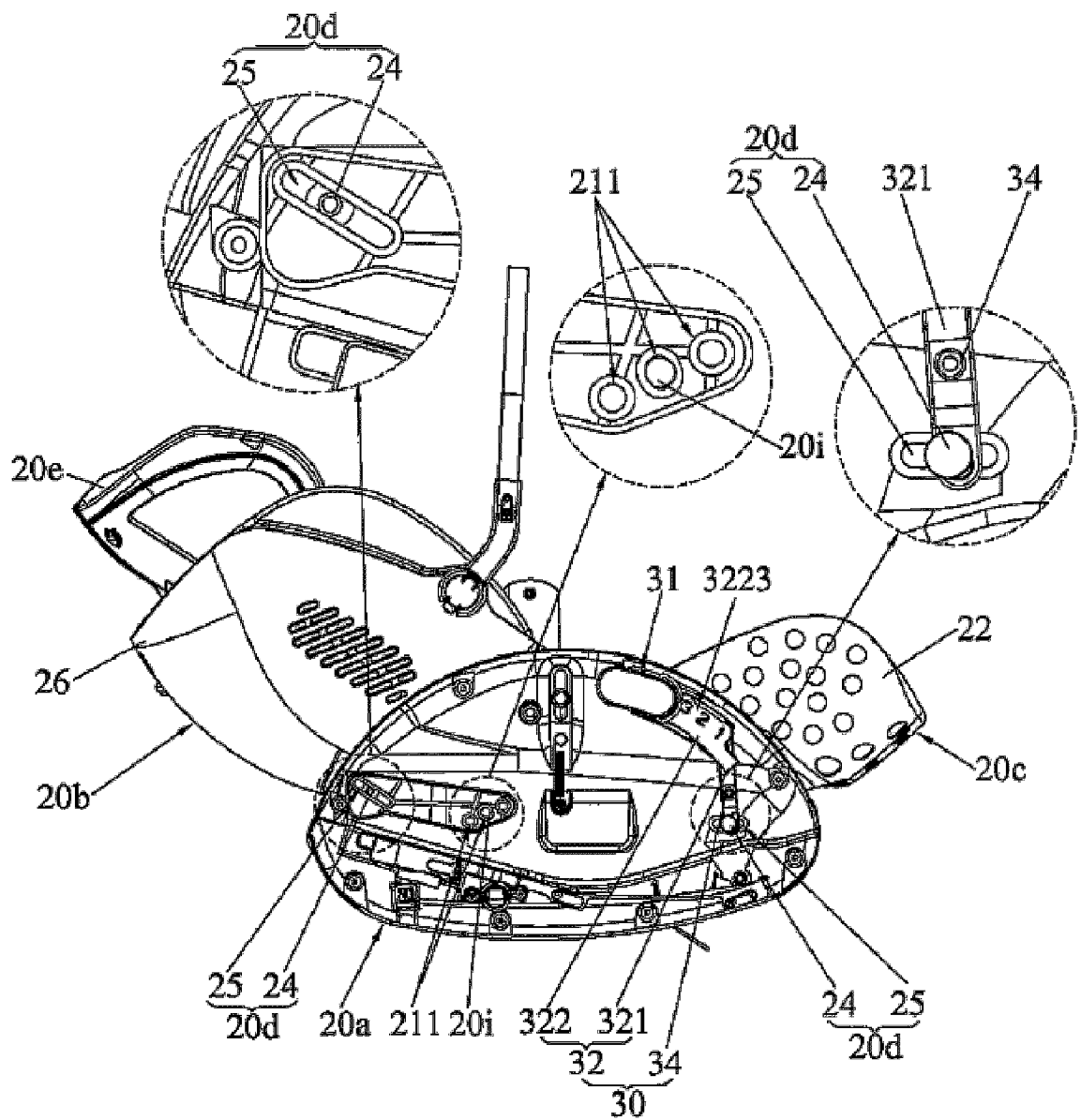
FIG. 10 is a schematic diagram of a side infrastructure view of the partial structures hidden in the right side wall of the holder of the seat shell configured at the status shown in FIG. 7.
Figure 11:
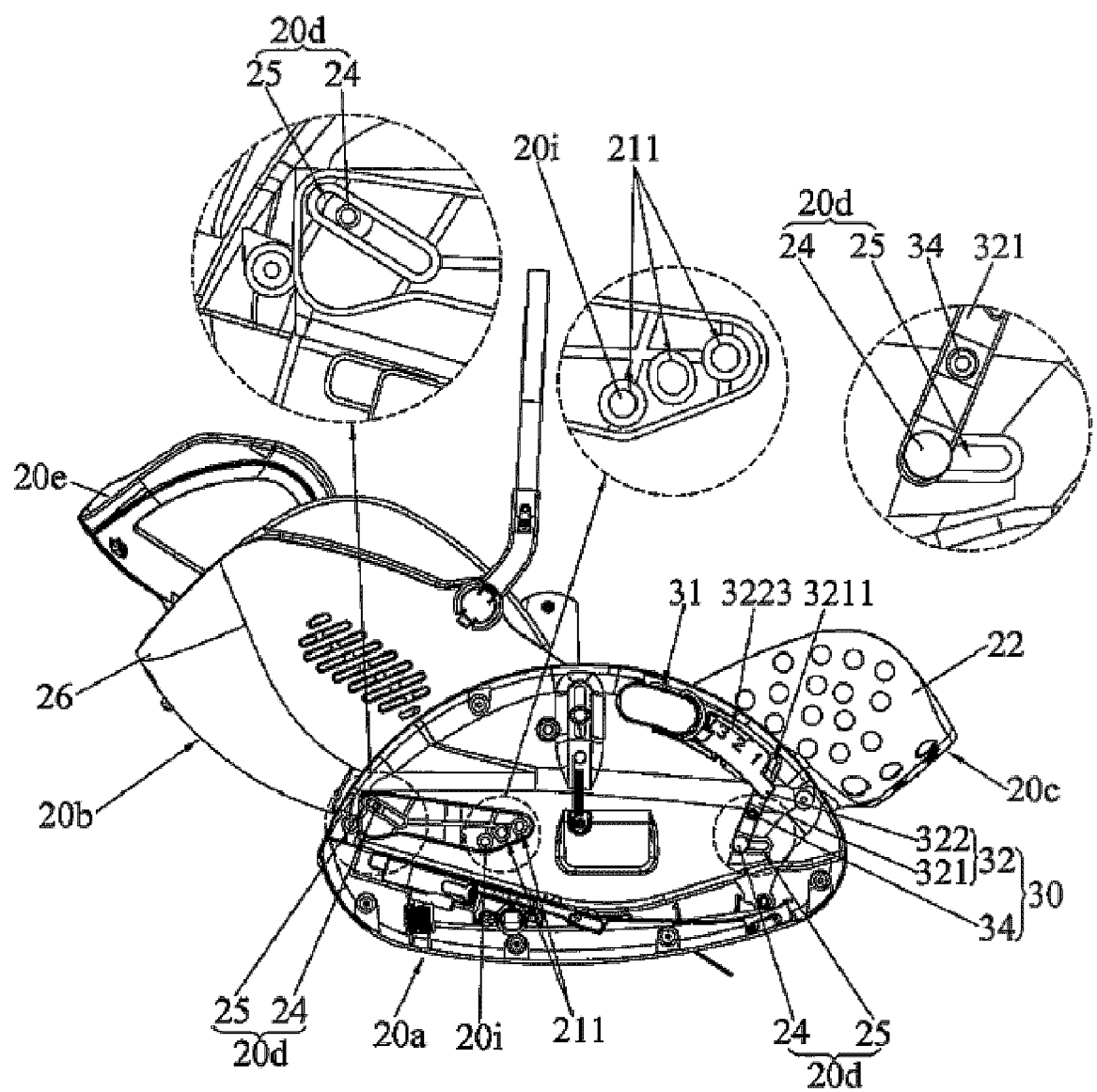
FIG. 11 is a schematic diagram of a side infrastructure view of the partial structures hidden in the right side wall of the holder of the seat shell configured at the status shown in FIG. 8.
Figure 12:
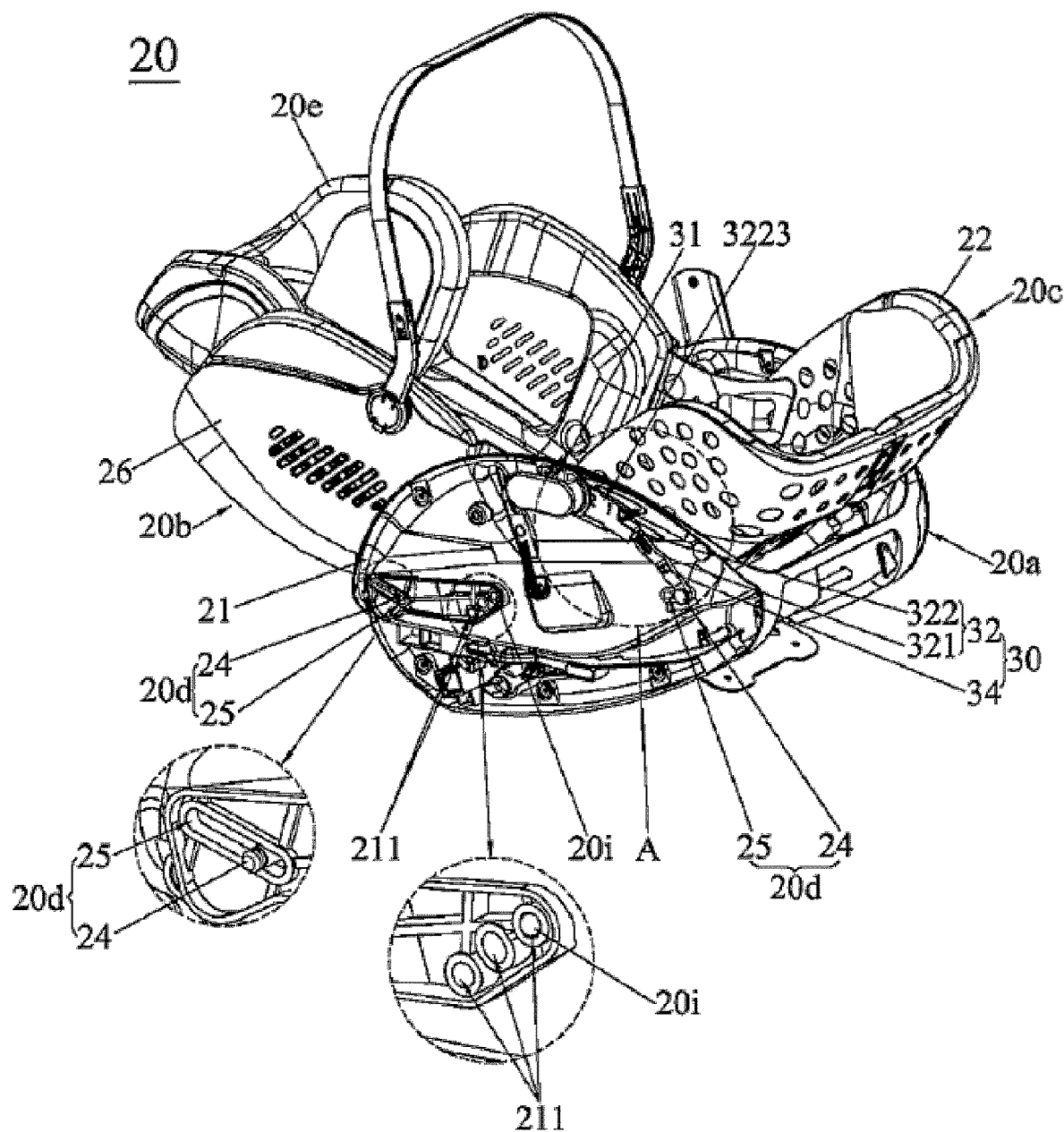
FIG. 12 is a schematic diagram of a perspective infrastructure view of the partial structures hidden in the right side wall of the holder of the seat shell configured at the status shown in FIG. 6.
Figure 13:
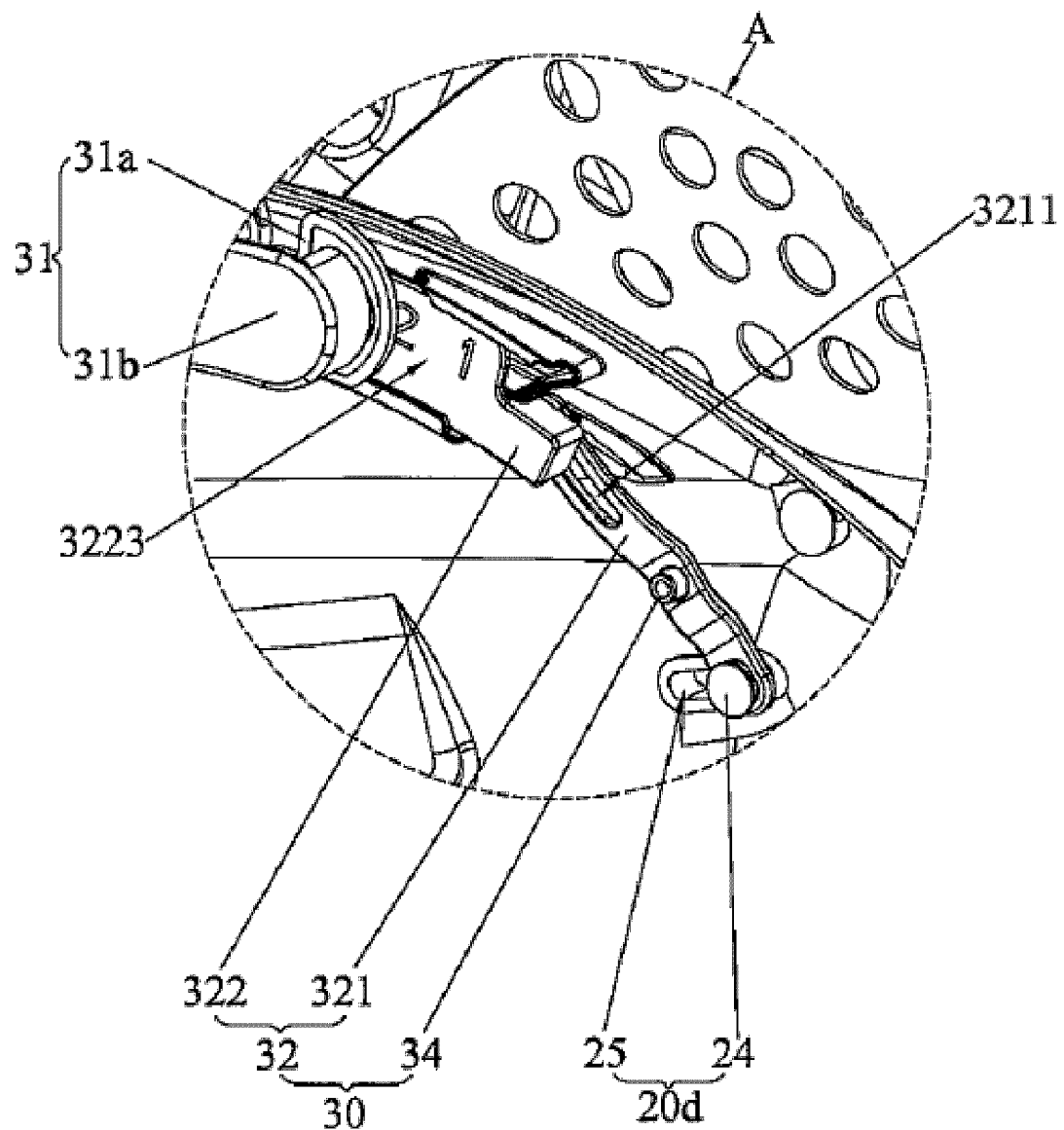
FIG. 13 is a schematic diagram of an enlarged view of the part A in FIG. 12.
Figure 16:
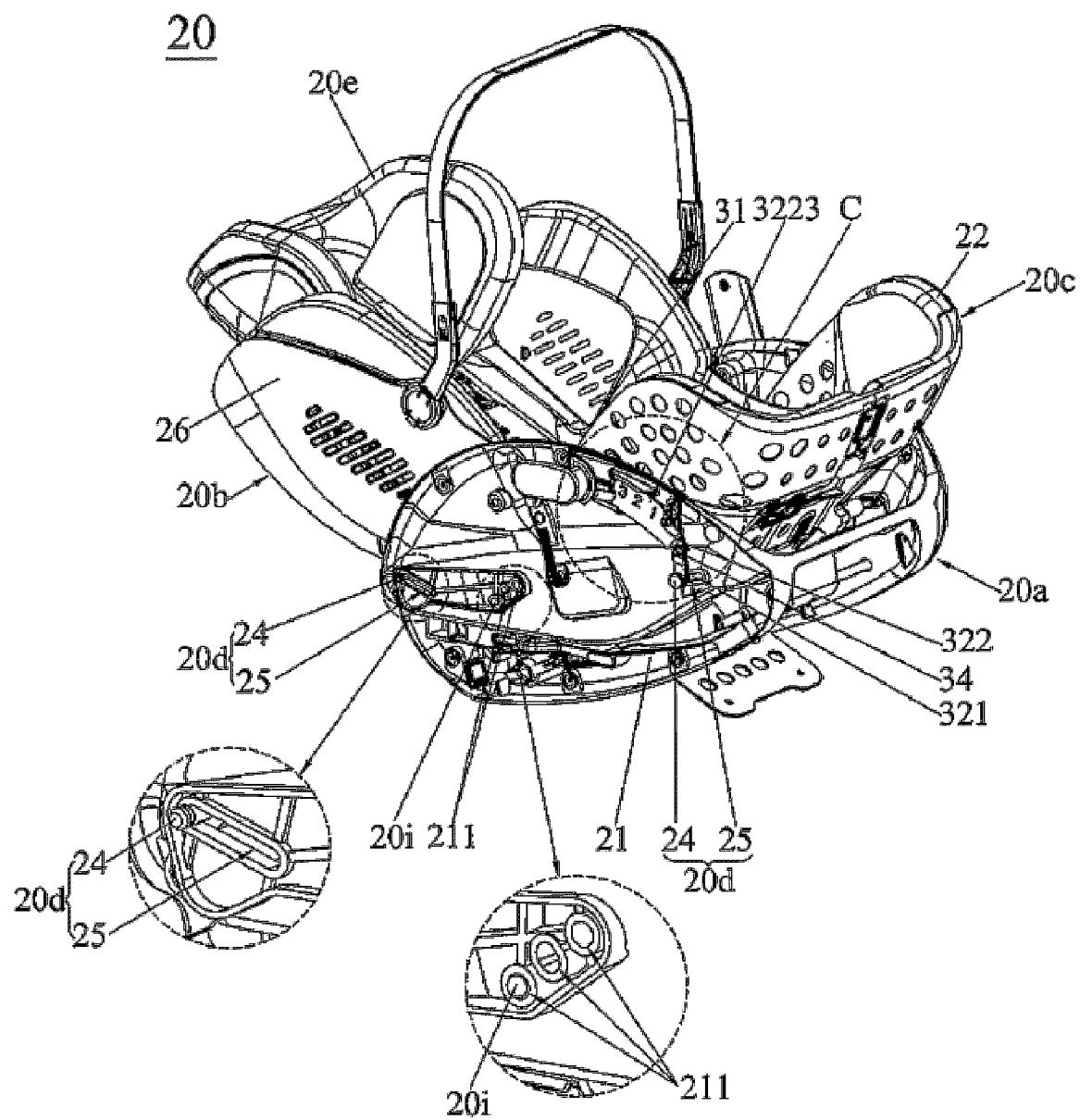
FIG. 16 is a schematic diagram of a perspective infrastructure view of the partial structures hidden in the right side wall of the holder of the seat shell configured at the status shown in FIG. 8.

As shown in FIG. 9 to FIG. 13, the safety belt guiding apparatus 30 is disposed to the child car seat 100 and includes a safety belt director 31 and a linking assembly 32 assembled to the holder 20a, preferably to the left and right side walls 21 of the holder 20a. Specifically, in the embodiments of the invention, one end of the linking assembly 32 is linked with the seat section 20c and another end of the linking assembly 32 is linked with the safety belt director 31. When the seat shell 20 is configured from the most reclining position or the transitional position to the most upright position, as shown in FIG. 18, the seat section 20c drives the safety belt director 31 through the linking assembly 32 to pop out of the holder 20a to a first position (please also refer to FIG. 17 for clear perspective view of the popped-out safety belt director 31), where a car seat belt may selectively pass through the popped-out safety belt director 31 at the first position, so that the seat shell 20 can be used independently or in combination with the base 10. For example, as shown in FIGS. 11, 16, and 18, in the embodiments of the current invention, the safety belt director 31 pops out of the holder 20a to the first position when the seat shell 20 is configured to the most upright position as shown in FIG. 18. As shown in FIGS. 9, 10, 12, and 14, in the embodiments of the current invention, the safety belt director 31 retracts to the holder 20a to the second position when the seat shell 20 is configured to the most reclining position or the transitional position. Apparently, in other practices, the safety belt director 31 may also pop out of the holder 20a to the first position when the seat shell 20 is configured to either the most reclining position or the transitional position based on actual needs and the implementation is not limited by the embodiments. It can be recognized that devising the backrest section 20b and the linking assembly 32 as a linkage is still fully capable of driving the safety belt director 31 to pop out of the holder 20a to the first position during the process of the seat shell 20 being configured among the most reclining position, the transitional position, and the most upright position, so the configuration is not limited thereof.

As shown in FIGS. 9, 10, 11, 12, 14, and 16, the guiding structure 20d disposed to the child car seat 100 of the invention is linked with the linking assembly 32, which is driven by the seat section 20c through the guiding structure 20d. Specifically, the linking assembly 32 is linked with the guide post 24 of the guiding structure 20d, preferably linked with, but not limited to, the guide post 24 at the seat section 20c. The guide post 24 slides along the guide slot 25 during the process of the seat section 20c backrest section 20b pivoting to each other. Preferably, as shown in FIG. 9 to FIG. 11, when the seat shell 20 switches from the most reclining position to the most upright position due to relative pivoting between the seat section 20c and the backrest section 20b, the guide post 24 slides from a right end of the guide slot 25 to a left end of the guide slot 25. The sliding guide post 24 drives the linking assembly 32 to move accordingly so that the reliability of dynamic transmission thereof is assured. For example, as shown in FIG. 9 to FIG. 17 and FIG. 19 to FIG. 20, the linking assembly 32 includes a linking member 321 and a driving member 322, which is utilized for selectively driving the safety belt director 31 to pop out of the holder 20a to the first position. The driving member 322 is movably, preferably slidably, disposed to the holder 20a, specifically to the side wall 21 of the holder 20a and is provided with room by the side wall 21. The linking member 321 is pivoted to the holder 20a, preferably to the side wall 21 of the holder 20a through a shaft 34 at the middle of the linking member 321, so that the pivot center falls in between the two ends of the linking member 321. One end of the linking member 321 is linked with the guide post 24 and the other end of the linking member 321 is linked with the driving member 322. Therefore, during the process of the guide post 24 sliding along the guide slot 25, the guide post 24 drives the linking member 321 to swing about the shaft 34, thereby driving the driving member 322 to slide on the holder 20a to selectively drive the safety belt director 31 to pop out of the holder 20a to the first position.

Figure 19:
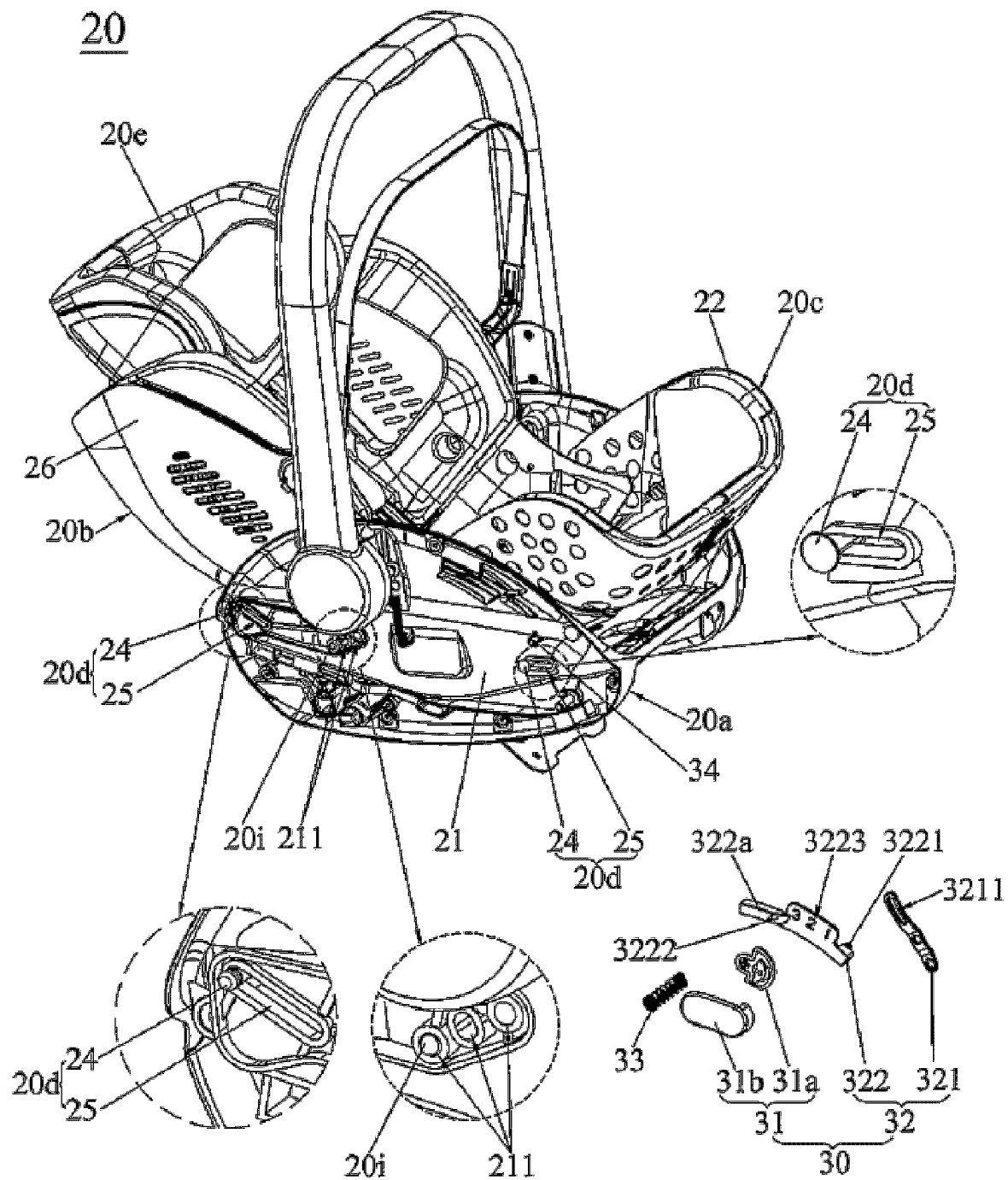
FIG. 19 is a schematic diagram of, from a certain visual angle, a perspective view of the seat shell configured at the status shown in FIG. 16 and an exploded view of a right side safety belt guiding apparatus as being detached from the holder.
Figure 20:
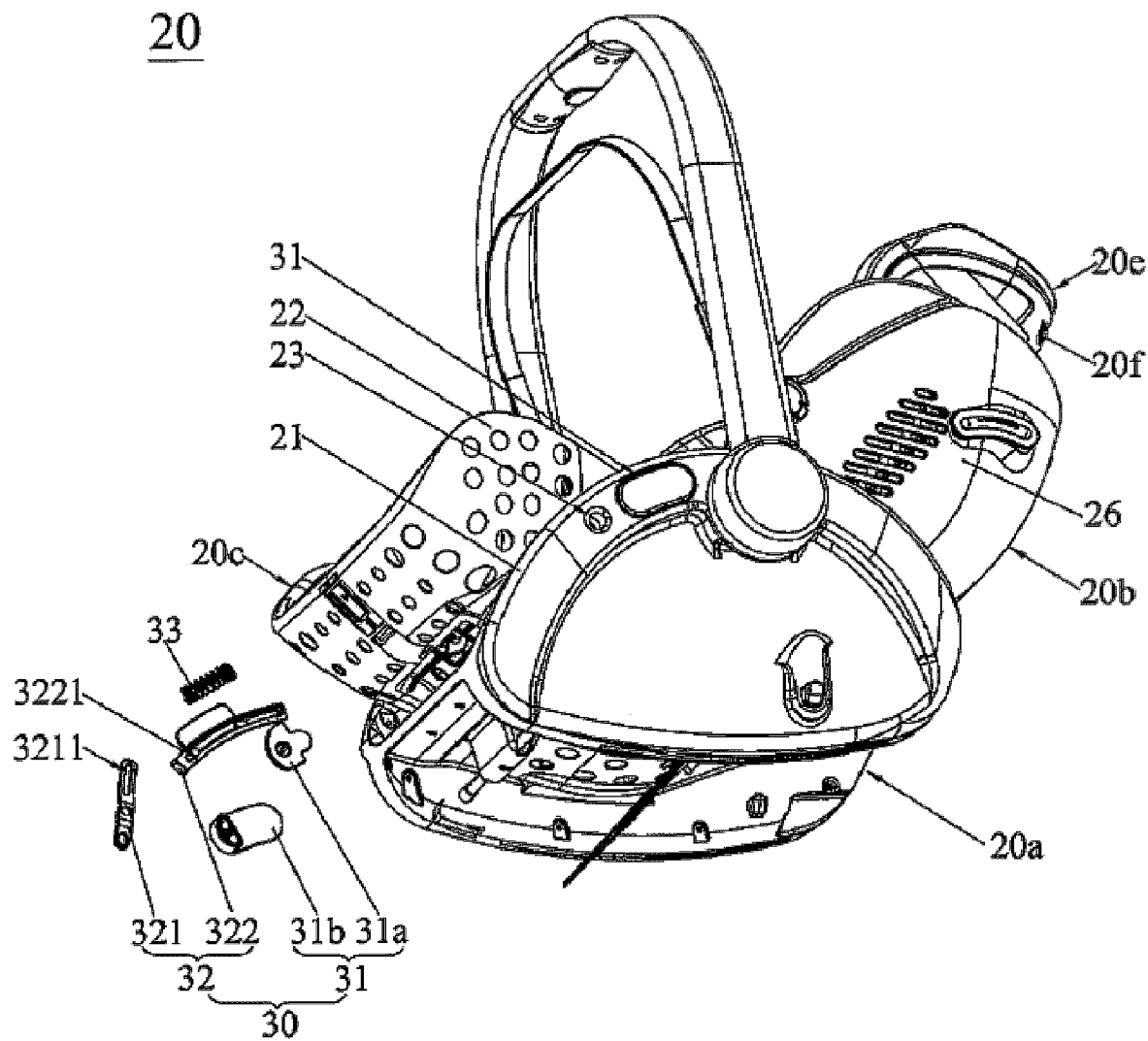
FIG. 20 is a schematic diagram of, from another visual angle, a perspective view of the seat shell configured at the status shown in FIG. 16 and an exploded view of the right side safety belt guiding apparatus as being detached from the holder.

As shown in FIG. 19 and FIG. 20, in the embodiments of the invention, the way how the driving member 322 is linked with the linking member 321 is as followed. The linking member 321 includes a linking slot 3211 (or a linking elongated hole) preferably in a curved shape and oriented along the longitudinal direction of the linking member 321. The driving member 322 includes a linking lump 3221 exemplified as a column structure and extending into the linking slot 3211 (or the linking elongated hole) and sliding therein, so in this way of configuration, a linkage between the driving member 322 and the linking member 321 is formed with reliability. In other embodiments, the linking slot 3211 (or the linking elongated hole) may be alternately formed at the driving member 322 and the linking lump 3221 may be alternately formed at the linking member 321 correspondingly to provide linkage between the driving member 322 and the linking member 321. The exemplary embodiment in the figures poses no limit to the configuration of how the linking member 321 and the driving member 322 are linked.

Figure 2:
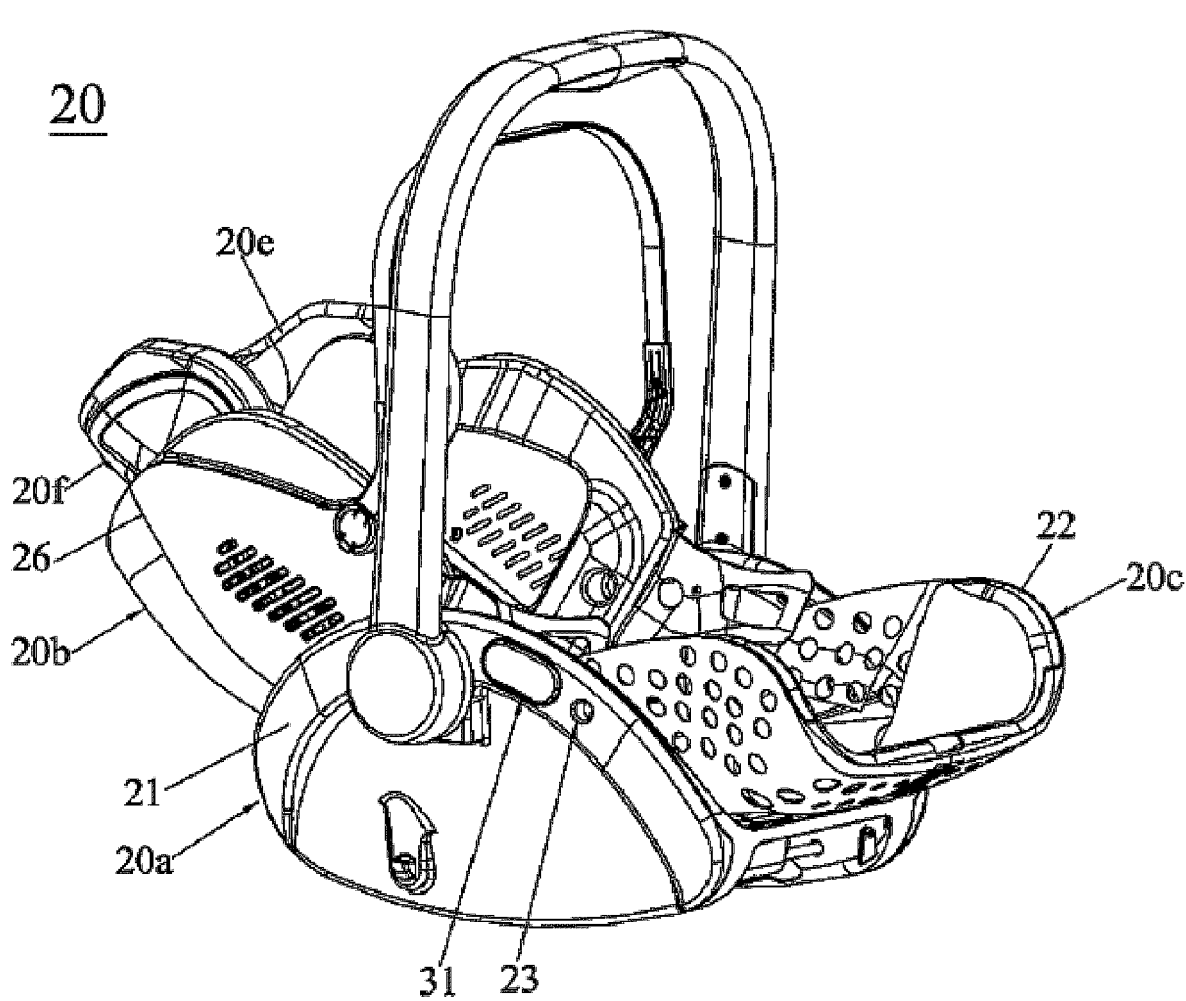
FIG. 2 is a schematic diagram showing a perspective view of the seat shell of the child car seat when used along in the invention.
Figure 17:
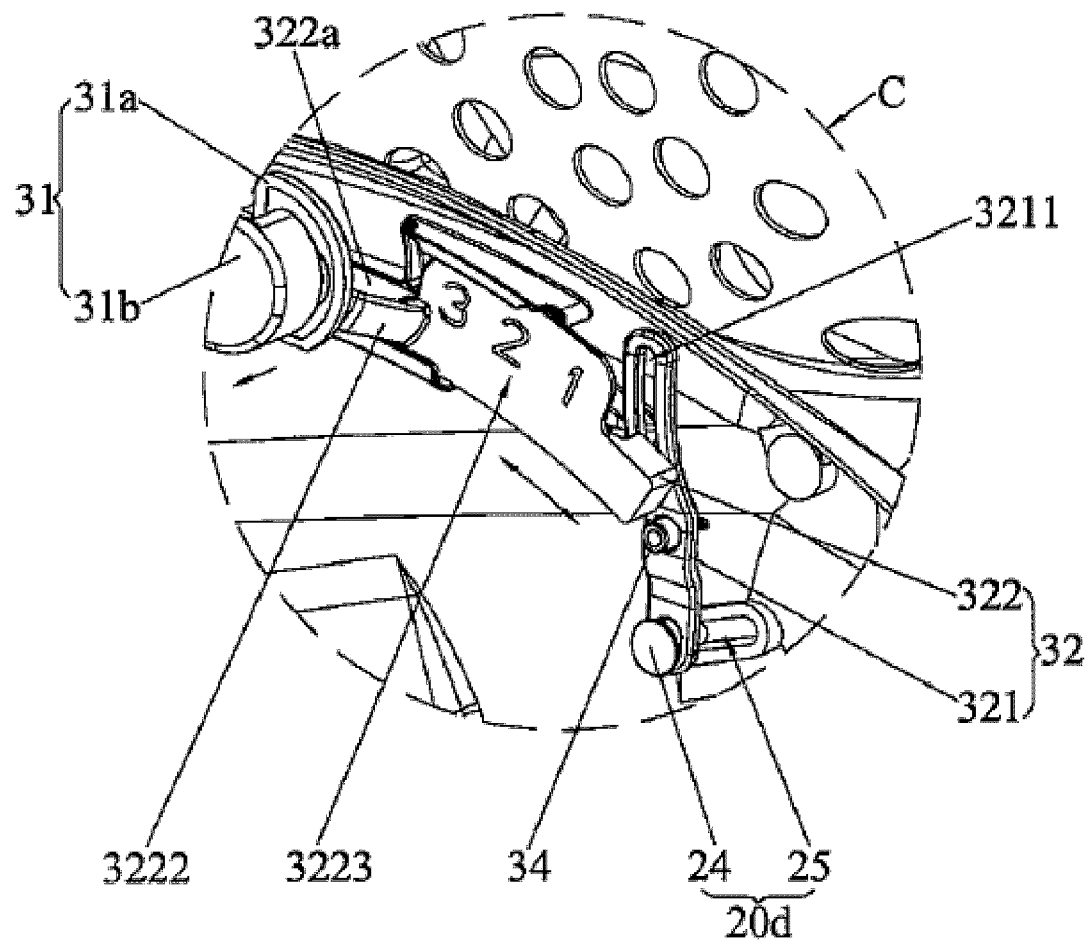
FIG. 17 is a schematic diagram of an enlarged view of the part C in FIG. 16.
Figure 18:
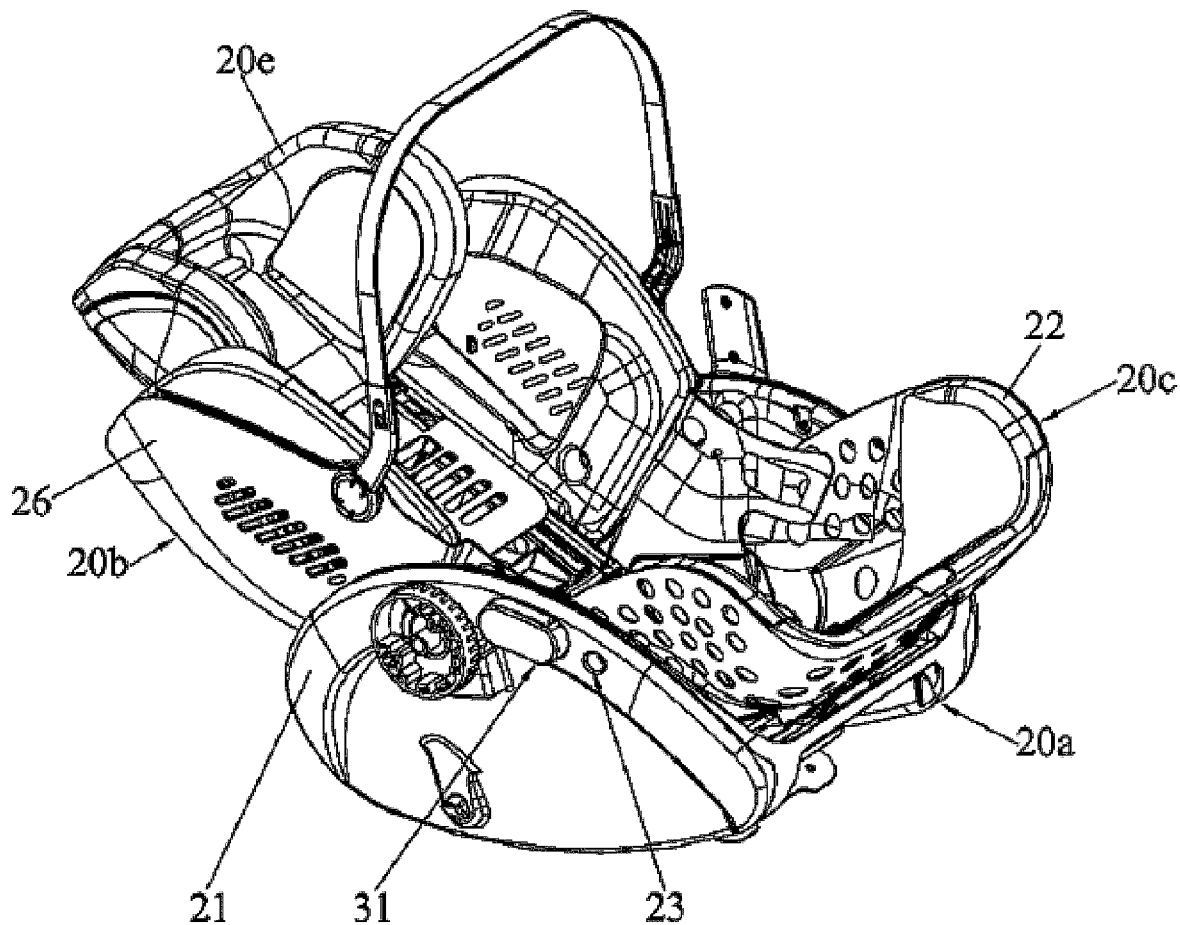
FIG. 18 is a schematic diagram of a perspective view of the seat shell configured at the status shown in FIG. 8, when a safety belt director pops out of the holder to the first position.
Figure 21:
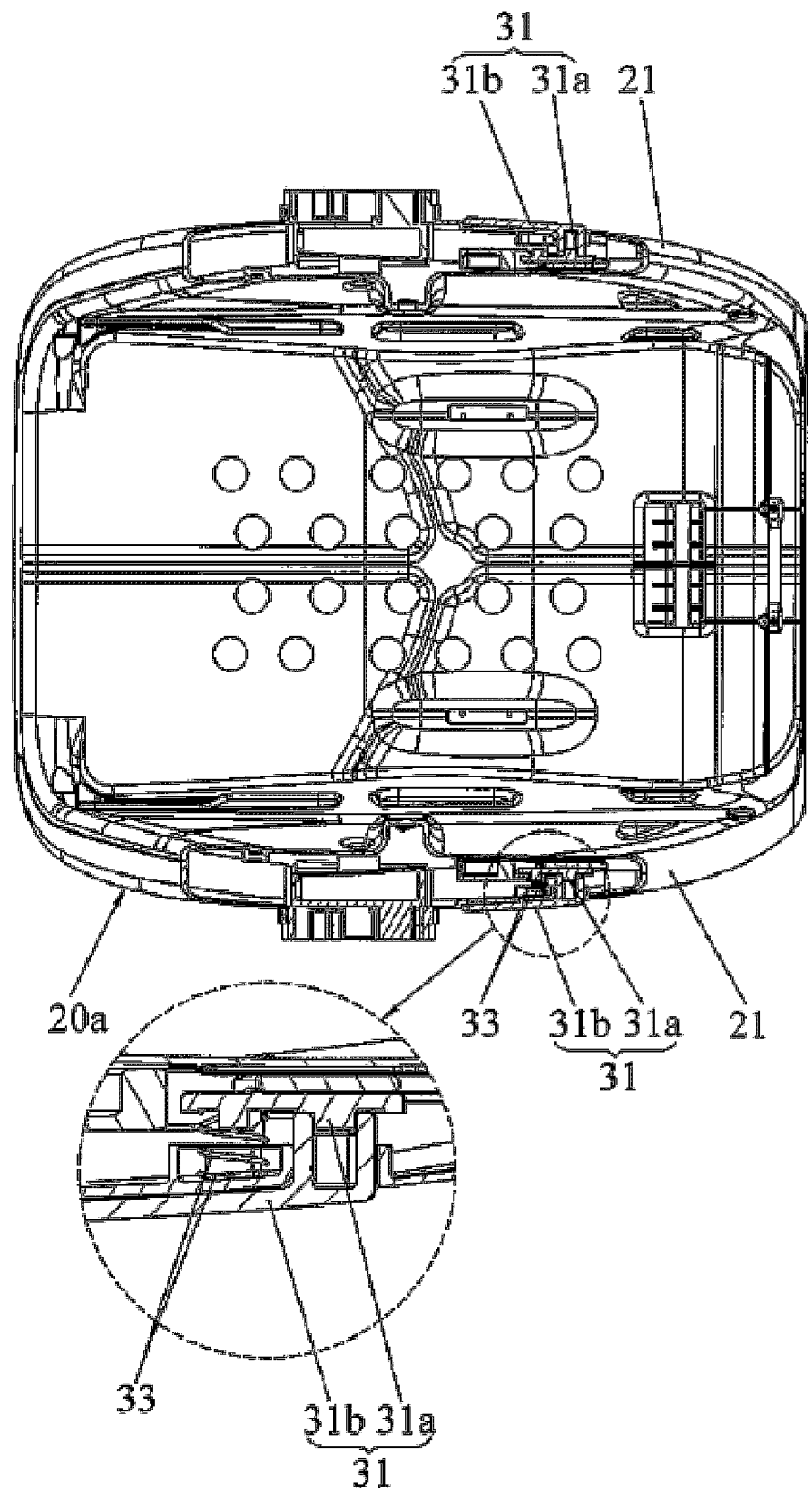
FIG. 21 is a schematic diagram of a top view of the holder, along with a corresponding top cross sectional view of the safety belt director, of the seat shell of the child car seat in the invention.

As shown in FIG. 16, FIG. 17 and FIG. 19, the driving member 322 includes a pushing section 322a adapted to push against the safety belt director 31 to pop out of the holder 20a to the first position selectively during the process of the driving member 322 sliding relatively to the holder 20a. A direction in which the safety belt director 31 pops out, indicated in FIG. 17 by the single arrow beside the safety belt director 31, intersects a sliding direction of the driving member 322, indicated in FIG. 17 by the double arrow, in such a way that the safety belt director 31 pops out of the holder 20a to the first position along a left-to-right direction of the holder 20a. For example, the pushing section 322a includes a pushing bevel 3222 inclined outward along a direction in which the driving member 322 slides near the safety belt director 31, letting the driving member 322 to slide thereon along the way to contact and push the safety belt director 31 outward. In order to automatically retract the safety belt director 31 when relieved from being pushed by the driving member 322, the safety belt guiding apparatus 30 further includes a resilient restoring component 33 linked between the safety belt director 31 and the holder 20a. The resilient restoring component 33 bears the potential to drive the popped-out safety belt director 31 at the first position to retract to the holder 20a to the second position, and please refer to FIG. 1 or FIG. 2 for the status when the safety belt director 31 has retracted to the holder 20a. For example, in the embodiments of the invention, the resilient restoring component 33 can be selected in the form of a spring or in the form of, but not limited to, other kinds of resilient structures. And in FIG. 21, the safety belt director 31 includes an anchoring portion 31a inbuilt in the holder 20a and an on-lay portion 31b positioned outside of the holder 20a and incorporated with the anchoring portion 31a. The resilient restoring component 33 is deployed along the popped-out direction of the safety belt director 31, where one end the resilient restoring component 33 abuts against the anchoring portion 31a and the other end of the resilient restoring component 33 abuts against a portion of the holder 20a between the anchoring portion 31a and the on-lay portion 31b, such that when the safety belt director 31 pops out of the holder 20a to the first position, the resilient restoring component 33 is compressed to provide restoring force for the safety belt director 31, while the configuration is not limited thereof.

Figure 6:
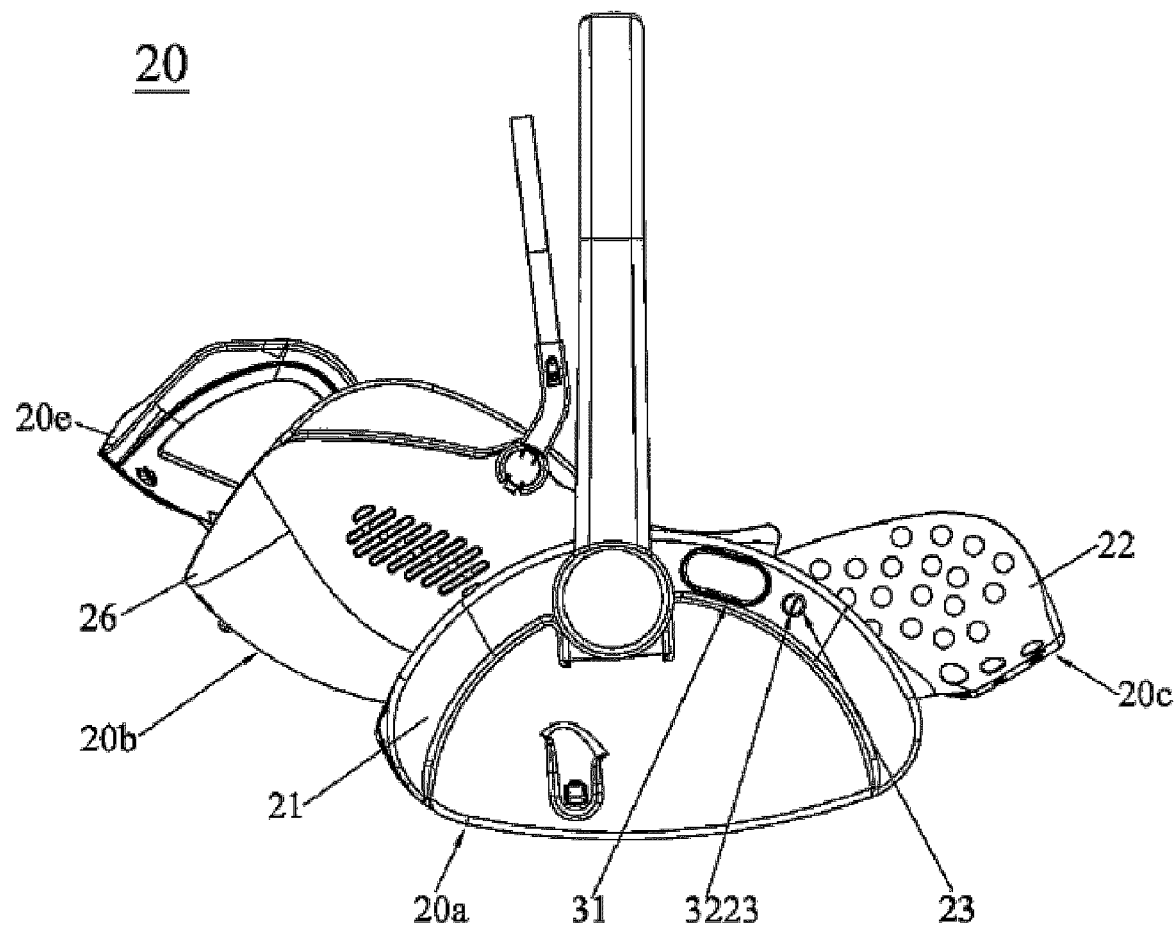
FIG. 6 is a schematic diagram showing a right side view of the seat shell, being used alone and configured at a most reclining position, of the child car seat in the invention.
Figure 7:
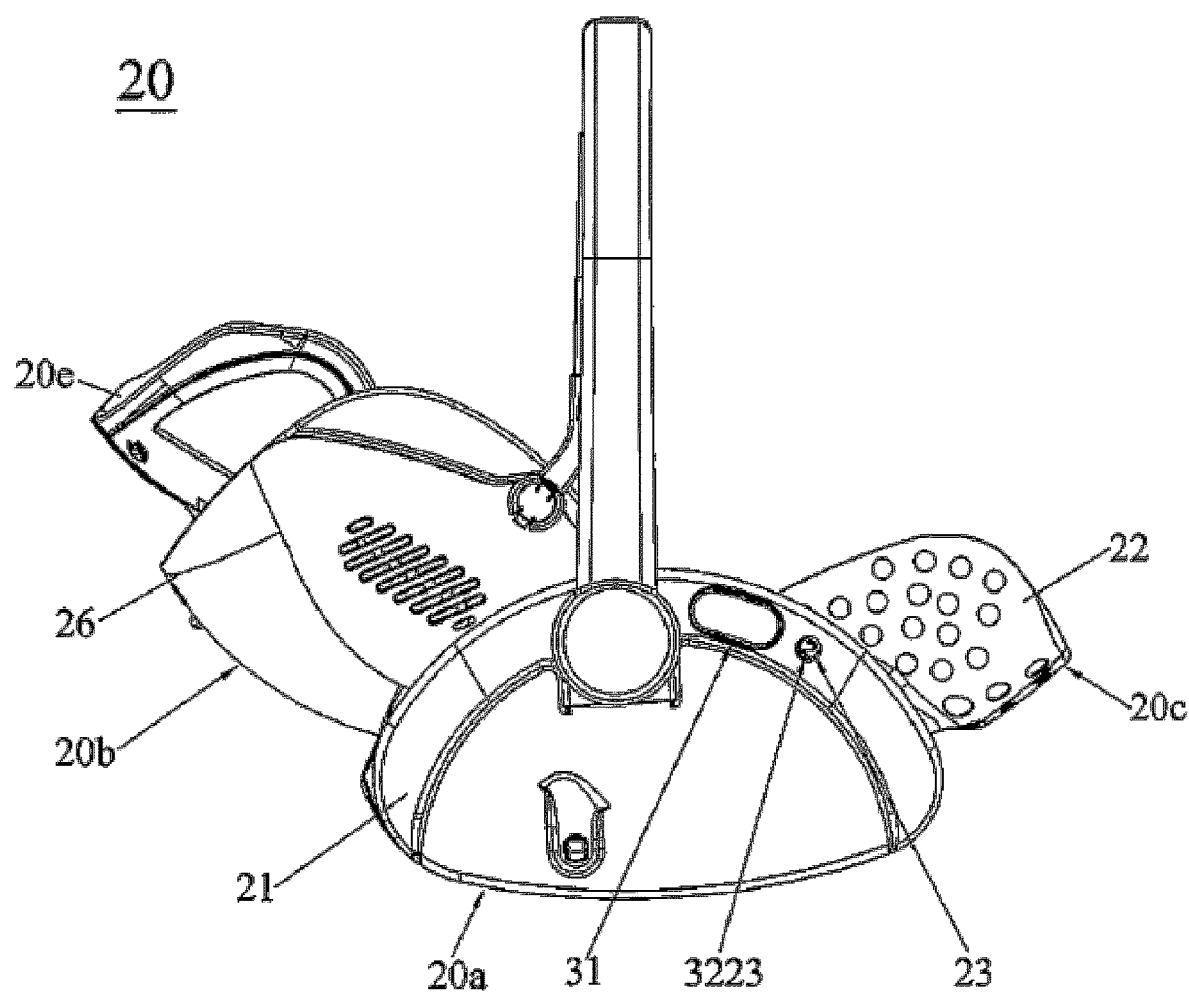
FIG. 7 is a schematic diagram showing a right side view of the seat shell, being used alone and configured at a transitional position, of the child car seat in the invention.
Figure 8:
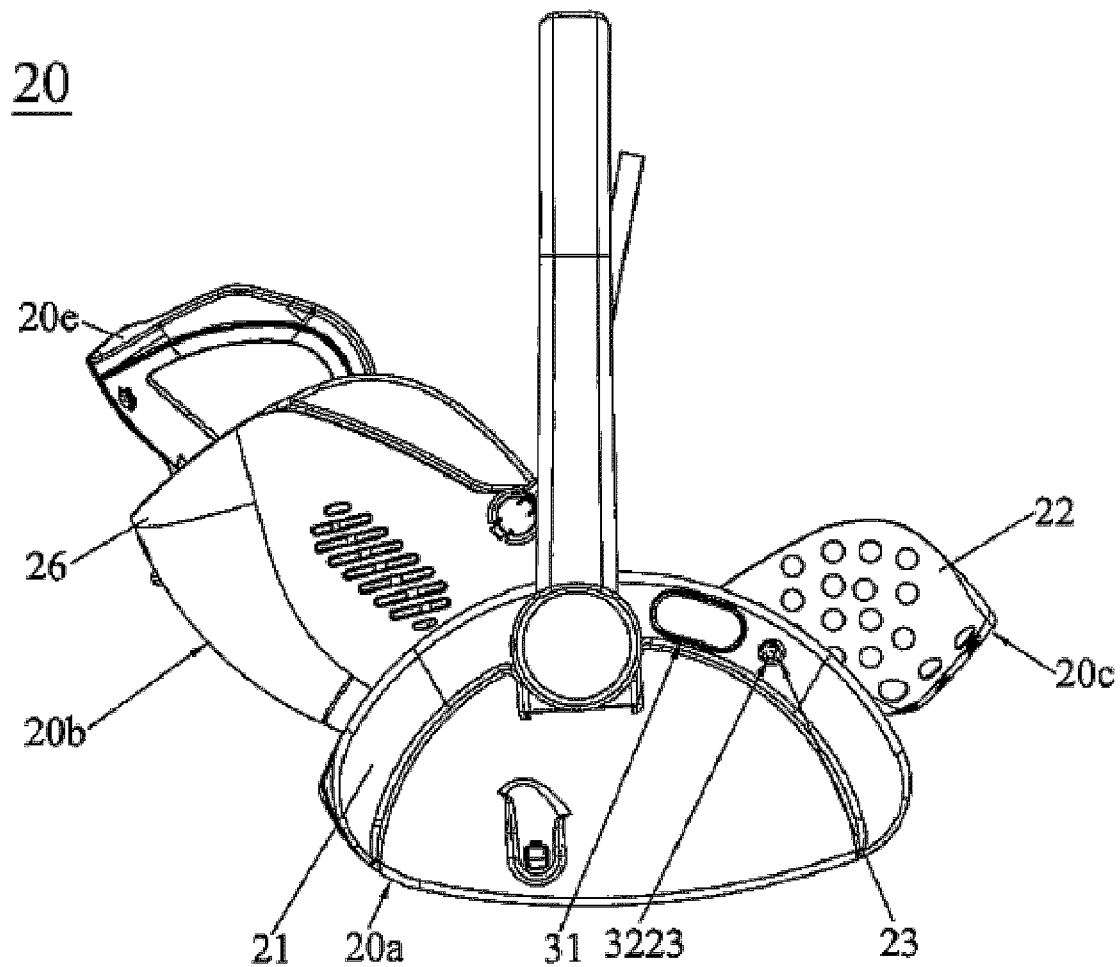
FIG. 8 is a schematic diagram showing a right side view of the seat shell, being used alone and configured at a most upright position, of the child car seat in the invention.

As shown in FIG. 6 to FIG. 17, the driving member 322 includes gear regulation marks 3223 respectively corresponding to the using positions of the seat shell 20 and the holder 20a includes a peephole 23 aligning with one of the gear regulation marks 3223, so the current using position of the seat shell 20 may be checked through the peephole 23. As shown in FIG. 6, the peephole 23 aligns with a first gear mark of the gear regulation marks 3223 when the seat shell 20 is configured at the most reclining position. As shown in FIG. 7, the peephole 23 aligns with a second gear mark of the gear regulation marks 3223 when the seat shell 20 is configured at the transitional position. As shown in FIG. 8, the peephole 23 aligns with a third gear mark of the gear regulation marks 3223 when the seat shell 20 is configured at the most upright position.

Figure 14:
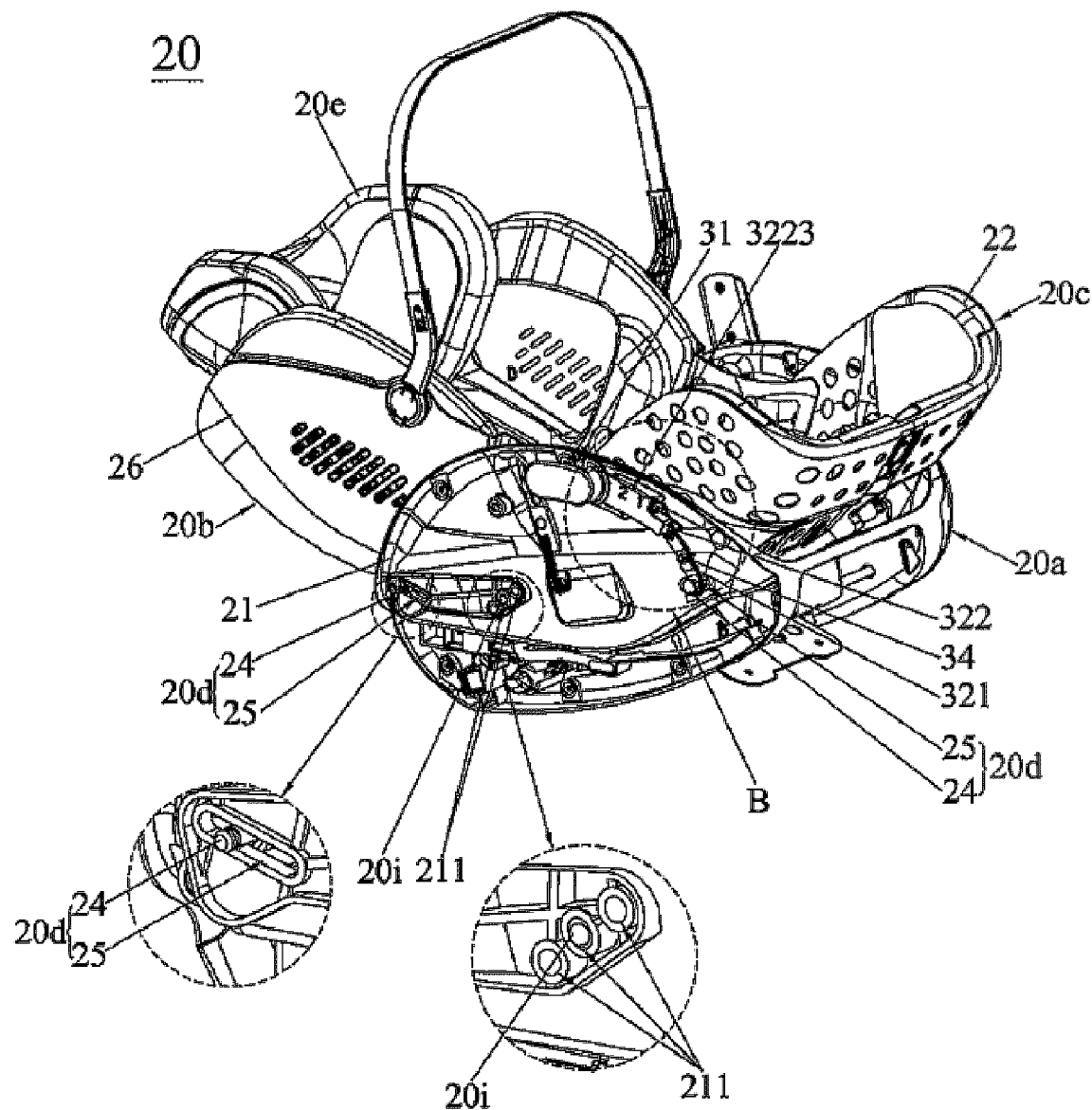
FIG. 14 is a schematic diagram of a perspective infrastructure view of the partial structures hidden in the right side wall of the holder of the seat shell configured at the status shown in FIG. 7.
Figure 15:
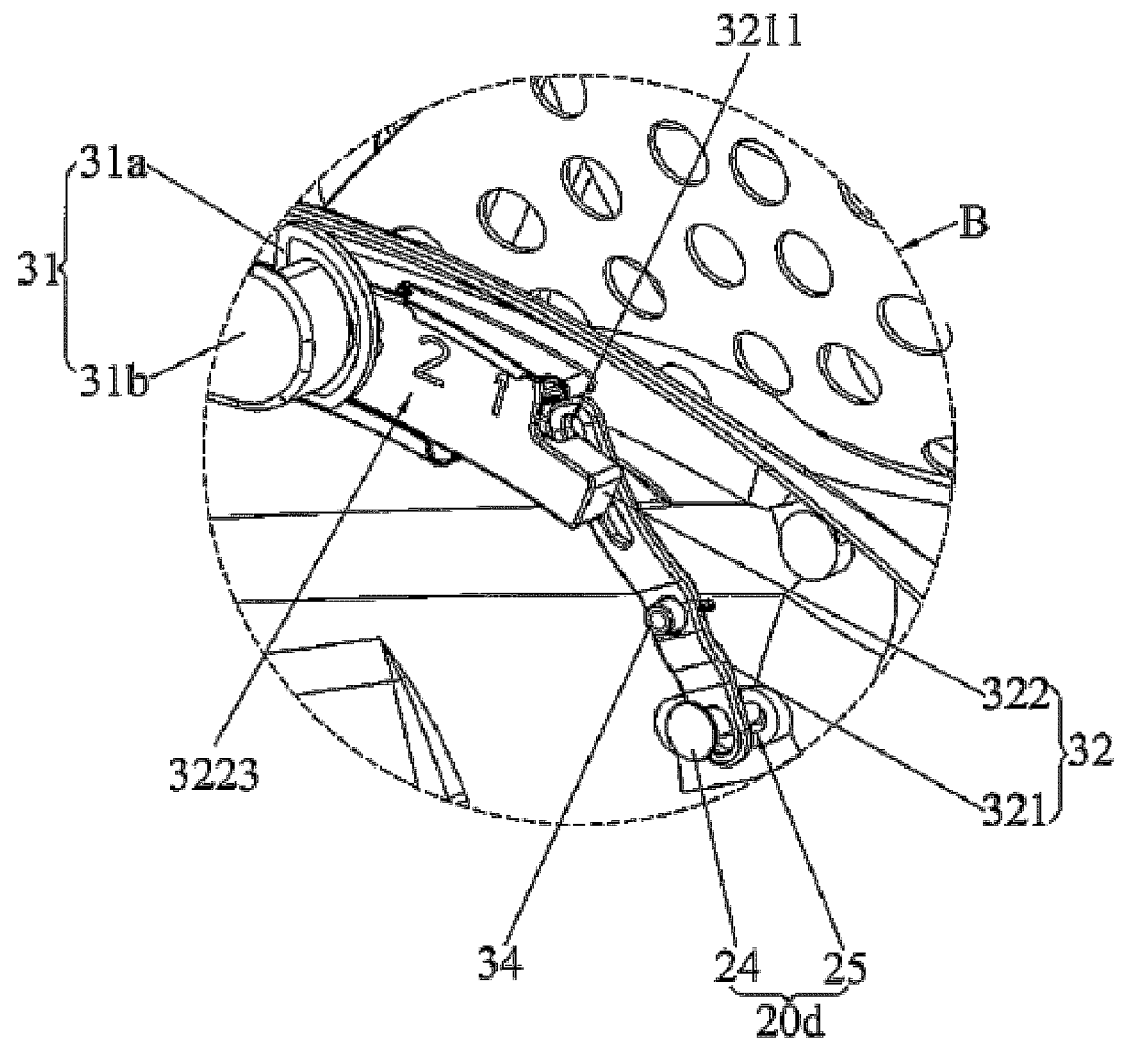
FIG. 15 is a schematic diagram of an enlarged view of the part B in FIG. 14.

Along with the figures, switching of the seat shell 20 of the child car seat 100 among the most reclining position, the transitional opposition, and the most upright position is described below. When the seat shell 20 is to be converted from the most reclining position shown in FIG. 6, FIG. 9, or FIG. 12 to the transitional position shown in FIG. 7, FIG. 10, or FIG. 14, a user manipulates the backrest actuator 20g to drive the locking pin 20i to be disengaged from a right most locking hole 211 on the holder 20a so that the backrest section 20b and the holder 20a are free to pivot relatively to each other. As the seat shell 20 is configured to the transitional position shown in FIG. 7, FIG. 10, or FIG. 14 through the relative pivoting between the backrest section 20b and the holder 20a, the user stops the manipulation of the backrest actuator 20g and the locking pin 20i is engaged with a middle locking hole 211, as shown in FIG. 10 or FIG. 14 for this status. As the seat shell 20 continues to be converted to the status shown in FIG. 8, FIG. 11, or FIG. 16, the user again manipulates the backrest actuator 20g to drive the locking pin 20i to be disengaged from the middle locking hole 211 on the holder 20a so that the backrest section 20b and the holder 20a are free to pivot relatively to each other. When the seat shell 20 is configured to the most upright position shown in FIG. 8, FIG. 11, or FIG. 16 through the relative pivoting between the backrest section 20b and the holder 20a, the user stops the manipulation of the backrest actuator 20g and the locking pin 20i is engaged with a left-most locking hole 211, as shown in FIG. 11 or FIG. 16. In the process of the seat shell 20 being converted from the most reclining position to the most upright position, the first gear mark of the gear regulation marks 3223 aligns with the peephole 23 when the seat shell 20 is at the most reclining position as shown in FIG. 6, the second gear mark of the gear regulation marks 3223 aligns with the peephole 23 when the seat shell 20 is at the transitional position as shown in FIG. 7, and the third gear mark of the gear regulation marks 3223 aligns with the peephole 23 when the seat shell 20 is at the most upright position, as shown in FIG. 8.

Compared with prior arts, since the safety belt guiding apparatus 30 in the invention includes the safety belt director 31 and the linking assembly 32 assembled to the holder 20a, one end of the linking assembly 32 is linked with the backrest section 20b or the seat section 20c, and the other end of the linking assembly 32 is linked with the safety belt director 31, in the process of the seat shell 20 varying among various using positions, the backrest section 20b or the seat section 20c selectively drives, through the linking assembly 32, the safety belt director 31 to pop out of or to retract to the holder 20a to the second position. The seat belt is therefore able to selectively pass through the popped-out safety belt director 31 at the first position to fasten the stand-alone seat shell 20 or the seat shell 20 incorporated with the base 10 to the car seat. Hence, when the safety belt director 31 on the seat shell 20 is driven by the backrest section 20b or the seat section 20c, through the linking assembly 32, to pop out of the holder 20a to the first position, the seat shell 20 may be detached from the base 10 and fastened to the car seat alone or the seat shell 20 may be incorporated with the base 10 and then fastened to the car seat together, through the car safety belt passing through the safety belt director 31, so in the above ways the using modes of the child car seat 100 are provided with versatility and agility.

Please be noted that, in other embodiments, the child car seat 100 may only include the seat shell 20 and the safety belt director 31 mentioned above and is still fully functional, so the configuration is not limited to the examples given above.

Figure 22:
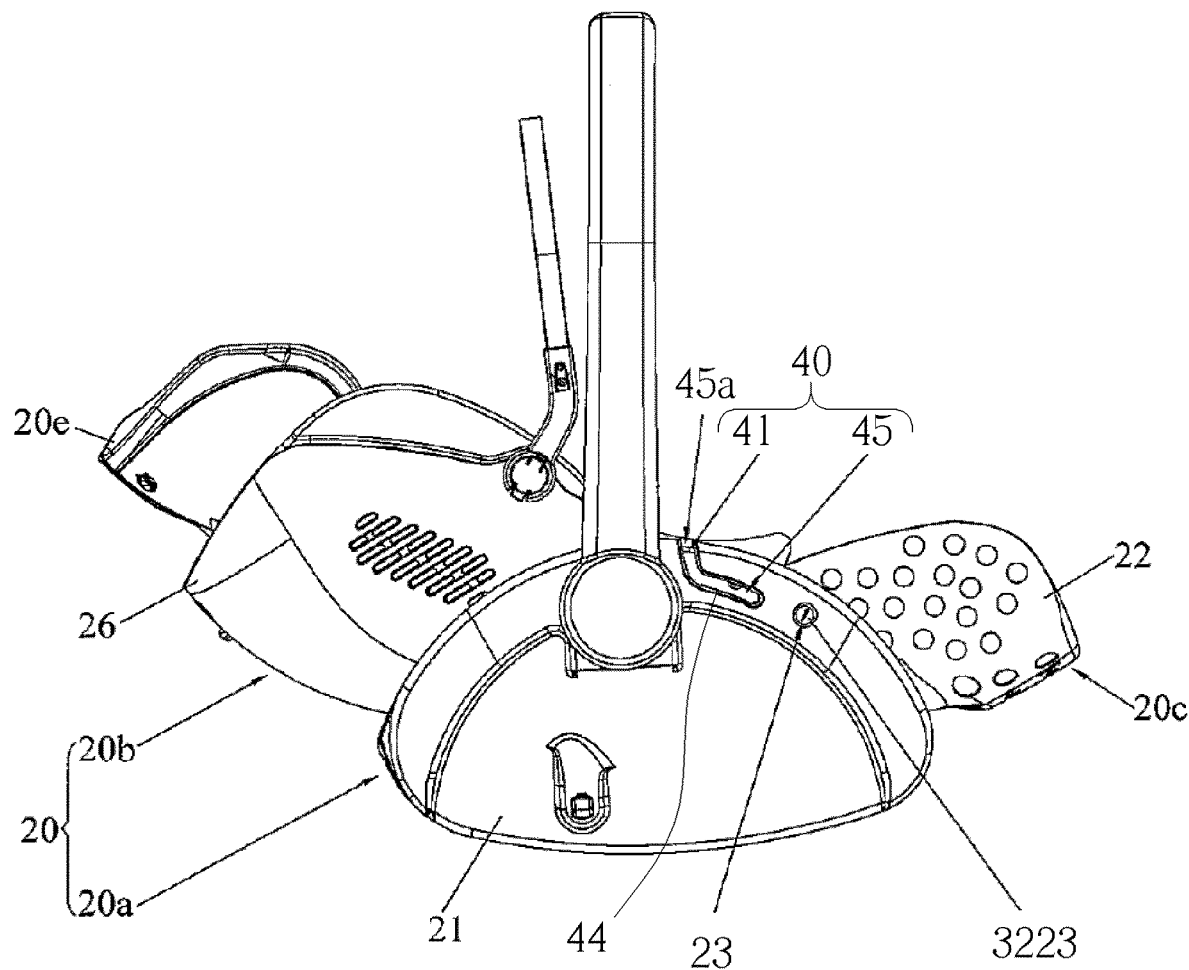
FIG. 22 is a schematic diagram showing a right side view of the seat shell of another embodiment, being used alone and configured at a most reclining position, of the child car seat in the invention.
Figure 23:
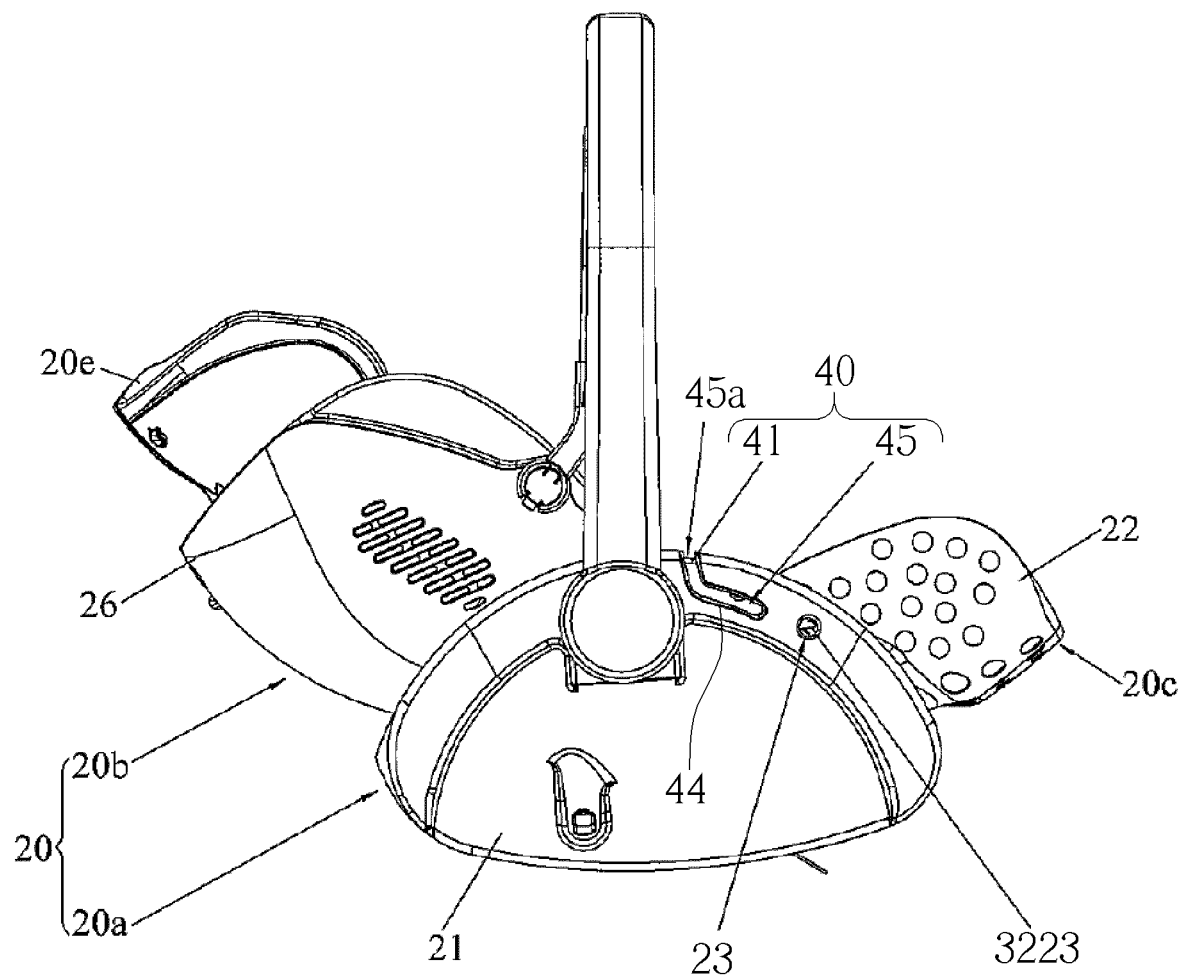
FIG. 23 is a schematic diagram showing a right side view of the seat shell of another embodiment, being used alone and configured at a transitional position, of the child car seat in the invention.
Figure 24:
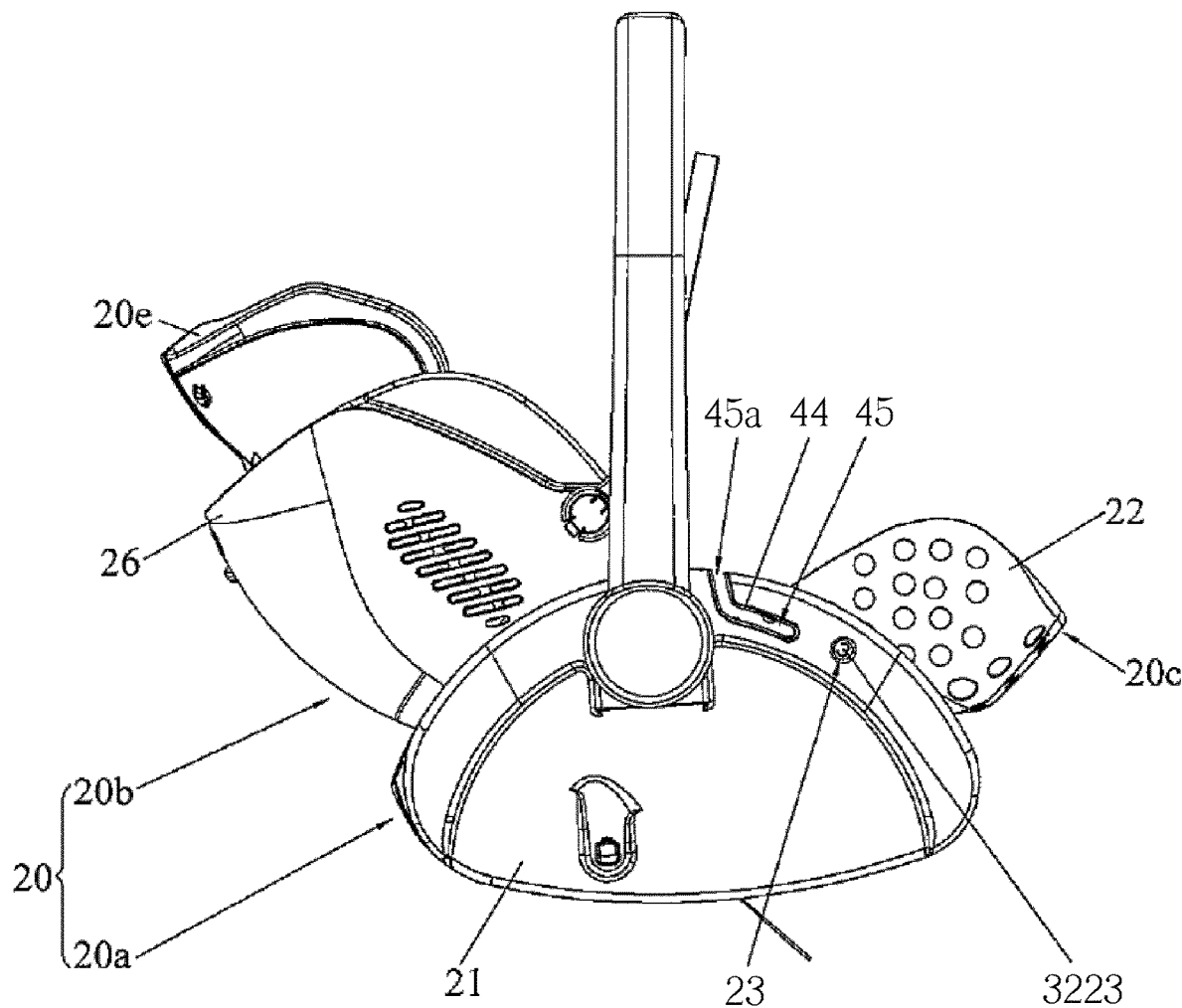
FIG. 24 is a schematic diagram showing a right side view of the seat shell of another embodiment, being used alone and configured at a most upright position, of the child car seat in the invention.
Figure 25:
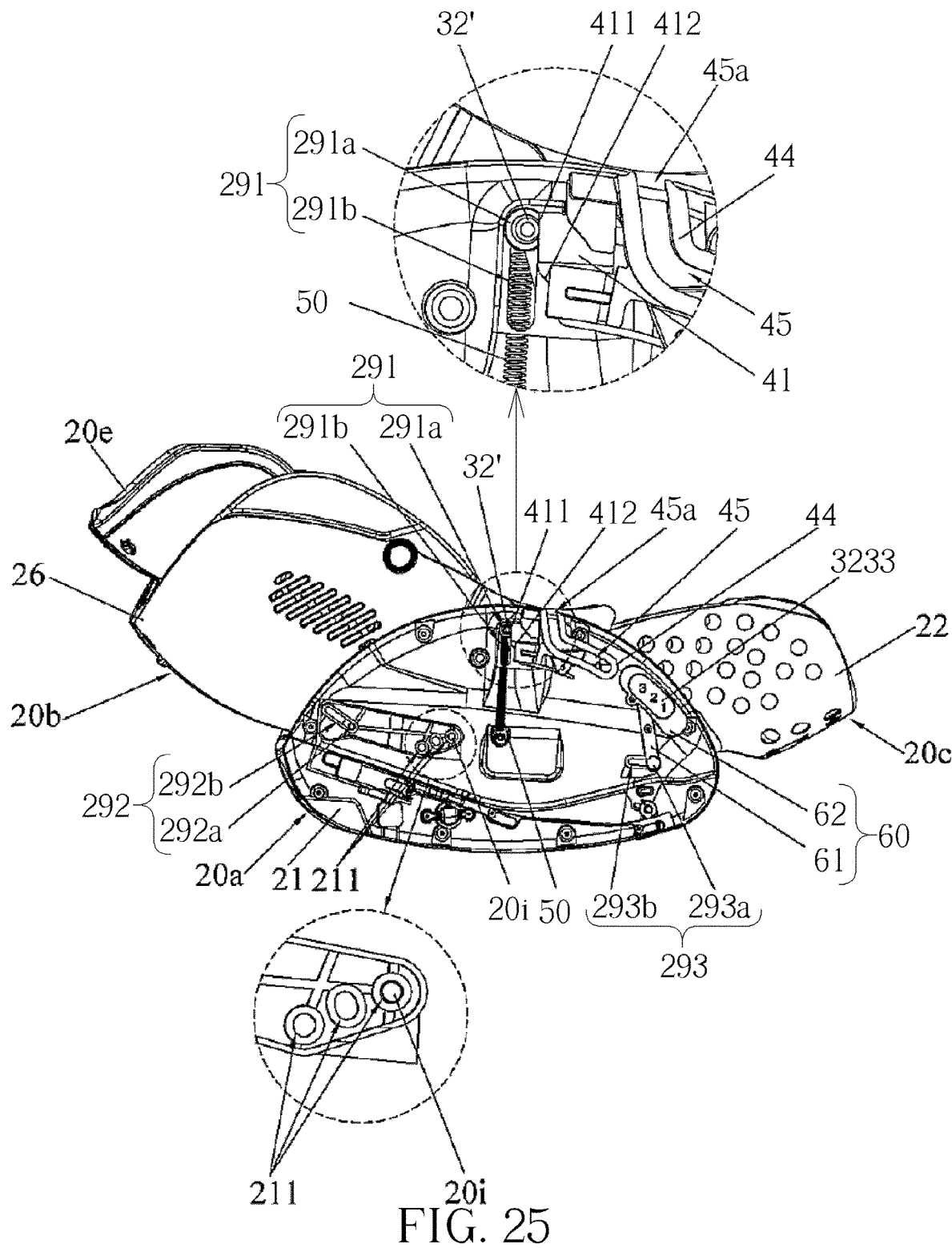
FIG. 25 is a schematic diagram of a side infrastructural view of partial structures hidden in a right side wall of a holder of the seat shell configured at the status shown in FIG. 22.
Figure 26:
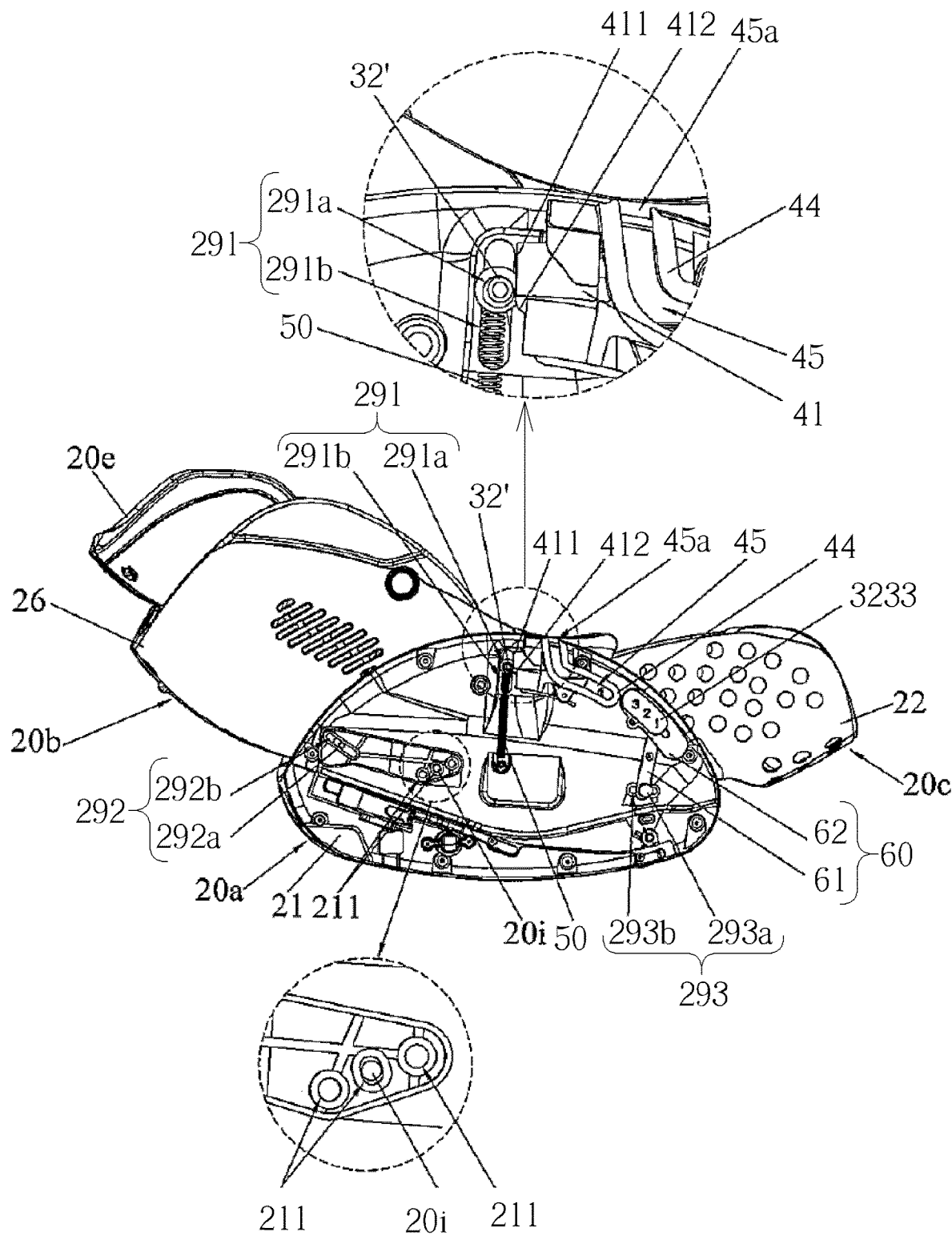
FIG. 26 is a schematic diagram of a side infrastructure view of the partial structures hidden in the right side wall of the holder of the seat shell configured at the status shown in FIG. 23.
Figure 27:
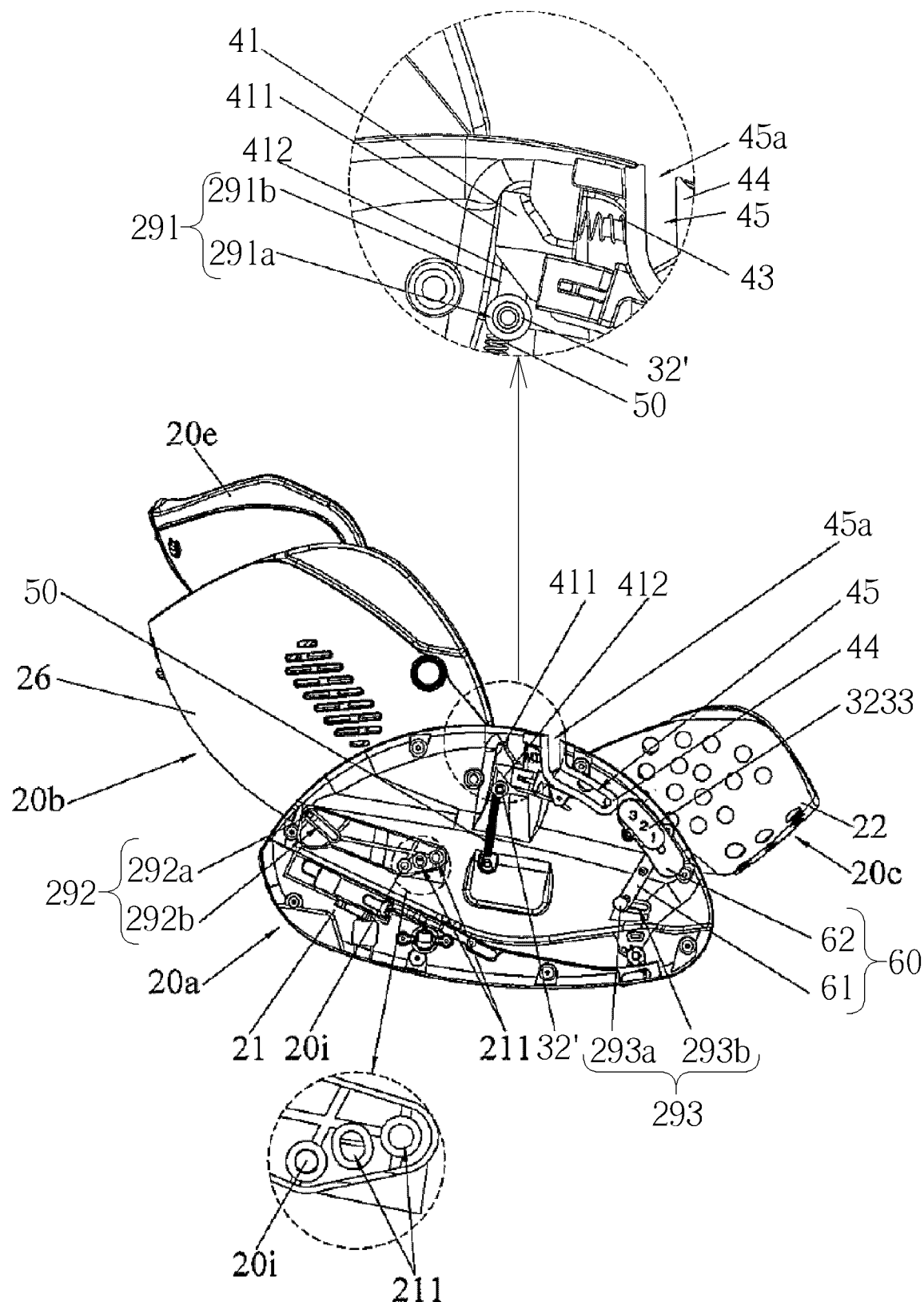
FIG. 27 is a schematic diagram of a side infrastructure view of the partial structures hidden in the right side wall of the holder of the seat shell configured at the status shown in FIG. 24.
Figure 28:
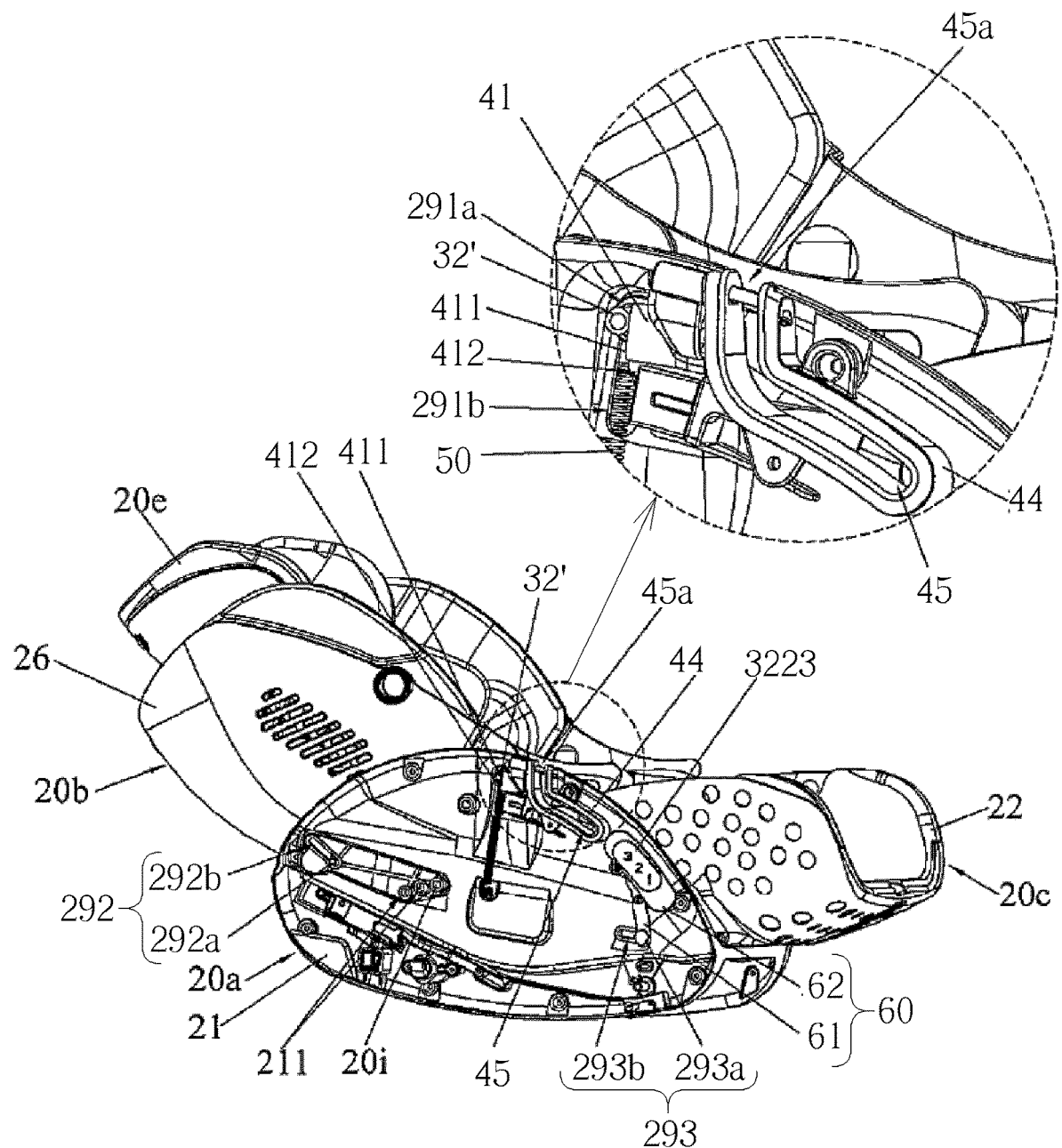
FIG. 28 is a schematic diagram of a perspective infrastructure view of the partial structures hidden in the right side wall of the holder of the seat shell configured at the status shown in FIG. 22.
Figure 29:
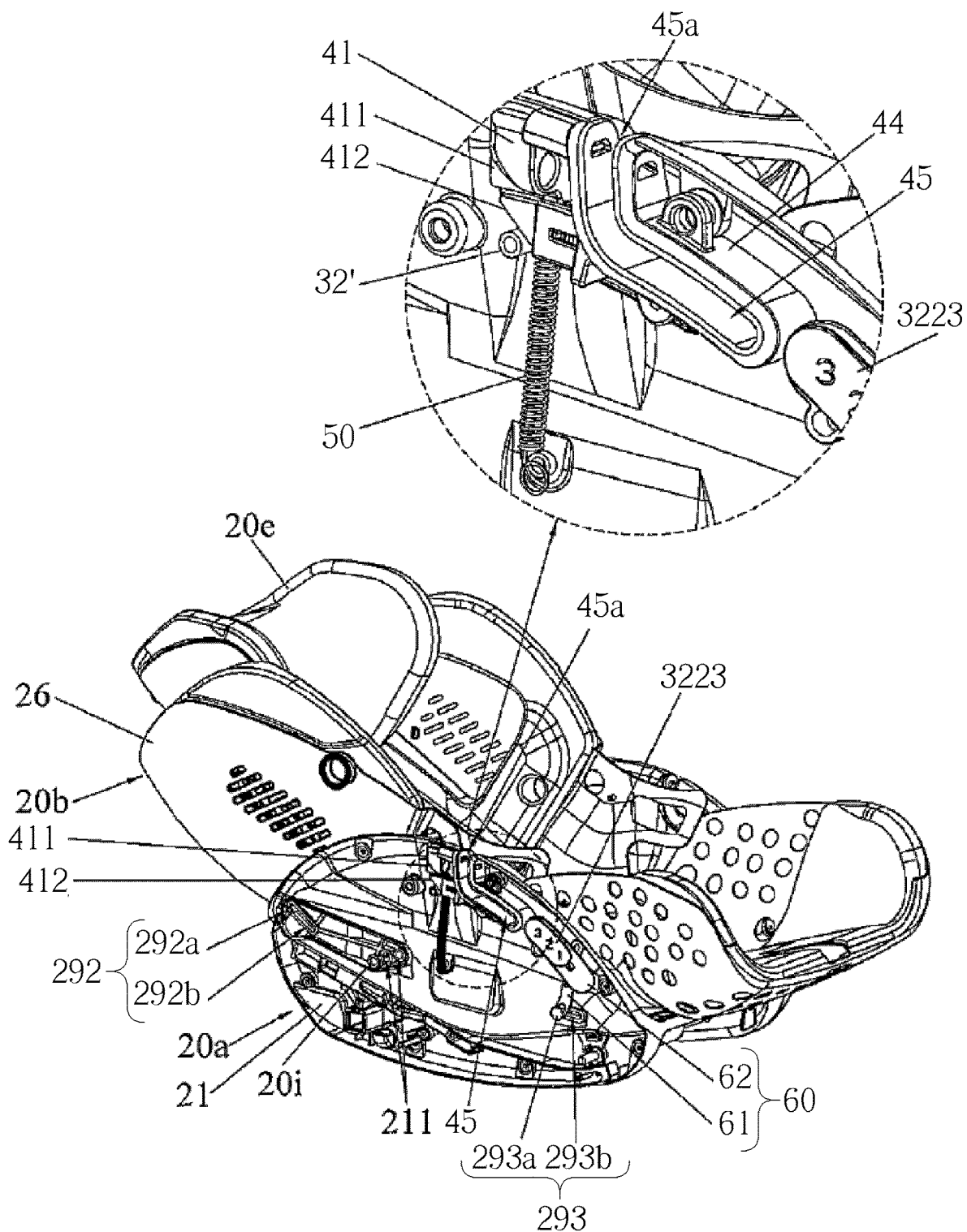
FIG. 29 is a schematic diagram of a perspective infrastructure view of the partial structures hidden in the right side wall of the holder of the seat shell configured at the status shown in FIG. 24.

Please refer to FIG. 22 to FIG. 29. In another embodiment of the invention, the safety belt guiding apparatus 30 is disposed to the child car seat 100, where the safety belt director 40 includes a blocker 41 movably disposed to the holder 20a, and a safety belt guiding passage 45 disposed to the holder 20a and threaded by the safety belt. A linking assembly 32' is disposed to the backrest section 20b and is linked with the blocker 41. An opening 45a is formed at the safety belt guiding passage 45 for the safety belt to pass therethrough. Specifically, the safety belt guiding passage 45 of the embodiment is positioned on the side wall 21 of the holder 20a, and the opening 45a of the safety belt guiding passage 45 is deployed along, but not limited to, an upward direction for the convenience of manipulation. The blocker 41 is slidably disposed to the holder 20a, preferably to the left and the right side walls 21 of the holder 20a respectively, and is driven by the backrest section 20b to be laid across or to be removed from the safety belt guiding passage 45 when blocking or unblocking the opening 45a. It should be noted that the blocker 41 of other embodiments may be pivoted to the holder 20a and driven by the backrest section 20b to block or unblock the opening 45a, and the implementation is not limited by the embodiments. As shown in FIG. 27 and FIG. 29, the blocker 41 is driven by the backrest section 20b via the linking assembly 32' to unblock the opening 45a during the switching of the seat shell 20 from the most reclining position or the transitional position to the most upright position, when the safety belt of the car enters the safety belt guiding passage 45 through the opening 45a to fasten the seat shell 20 to the car seat. For example, as shown in FIG. 24, FIG. 27, or FIG. 29, the blocker 41 of the embodiment moves away from the safety belt guiding passage 45 and retract to the holder 20a when the seat shell 20 switches to the most upright position, and as shown in FIG. 22, FIG. 23, FIG. 25, FIG. 26, and FIG. 28, the blocker 41 of the embodiment pops out of the holder 20a to the second position and is laid across the safety belt guiding passage 45 to block the opening 45a when the seat shell 20 switches to the most reclining position or the transitional position. It can be learned that the blocker 32 is able to be driven by the linking assembly 32' to selectively block or unblock the opening 45a during the switching of the seat shell 20 among the most reclining position, the transitional position, and the most upright position, given that the linking assembly 32' is disposed to the seat section 20c, so the implementation is not limited by the embodiments.

As shown in FIG. 25 to FIG. 29, the linking assembly 32' is formed on a first guiding structure 291, specifically on a first guide post 291a of the first guiding structure 291, integrating the linking assembly 32' and the first guide post 291a as a whole so that the blocker 41 may be driven by the first guiding structure 291, which simplifies the structure and the manipulation. Specifically, the safety belt guiding apparatus 30 of the embodiment also includes a first elastic component 43, and a fixer 44 that is disposed within the holder 20a. The first elastic component 43 bears constant potential of driving the blocker 41 to block or unblock the opening 45a for the convenience of threading the safety belt. The safety belt guiding passage 45 is positioned on the fixer 44 where the first elastic component 43 is linked to the blocker 41 and the fixer 44. It should be noted that the first elastic component 43 of other embodiments also bears constant potential of driving the blocker 41 to block or unblock the opening 45a when linked to the blocker 41 and the holder 20a, and the implementation is not limited by the embodiments. Further, the first elastic component 43 of the embodiment may be, but not limited to, a compressed spring. The blocker 41 further includes a bearing portion 411 and an inclined transitional portion 412, which is inclined relative to the bearing portion 411, for facilitating the reliability of the linkage between the linking assembly 32' and the blocker 41 to block or unblock the opening 45a. In the above configuration, the linking assembly 32' drives the blocker 41 to block the opening 45a when sliding from the inclined transitional portion 412 to the bearing portion 411. It should be noted that the linking assembly 32' of other embodiments may drive the blocker 41 to unblock the opening 45a when sliding from the inclined transitional portion 412 to the bearing portion 411, so it is not limited whether the opening 45a should be blocked or unblocked by the blocker 41 as the linking assembly 32' slides between the inclined transitional portion 412 and the bearing portion 411. For facilitating the linkage between the linking assembly 32' and the blocker 41, the linking assembly 32' may be a column structure, and a second elastic component 50 may be linked between the first guide post 291a and the side wall 21 of the holder 20a. It should be noted that the second elastic component 50 of other embodiments may be linked between the linking assembly 32' and the side wall 21 of the holder 20a, and the implementation is not limited by the embodiments. Further, the second elastic component 50 may be, but not limited to, a stretched spring. Note that in other embodiments, it is possible to omit the first elastic component 43 or the fixer 44 from the safety belt guiding apparatus 30.

As shown in FIG. 25 to FIG. 29, the child car seat 100 of the invention may further include a gear regulation marks structure 60, which includes a first pivoting member 61 and a second pivoting member 62. The first pivoting member 61 and the second pivoting member 62 are pivoted on the side wall 21 of the holder 20a, where, preferably, the middle portions of the first pivoting member 61 and the second pivoting member 62 are pivoted to the side wall 21 of the holder 20a respectively in such a way that the pivot of the first pivoting member 61 is located between two ends of the first pivoting member 61 and the pivot of the second pivoting member 62 is located between two ends of the second pivoting member 62. In the above configuration, one end of the first pivoting member 61 is linked with a third guide post 293a and the other end of the first pivoting member 61 is linked with one end of the second pivoting member 62. Gear regulation marks 3223 respectively corresponding to the using positions of the seat shell 20 are present on the second pivoting member 62, and a peephole 23 aligning with one of the gear regulation marks 3223 is present on the side wall 21 of the holder 20a. Therefore as shown in FIG. 25 to FIG. 27, the third guide post 293a slides from the right end of the third guide slot 293b to the left end of the third guide slot 293b as the seat shell 20 switches from the most reclining position to the most upright position through the relative pivoting between the seat section 20c and the backrest section 20b, driving the first pivoting member 61 to pivot, which further drives the second pivoting member 62 to pivot correspondingly so that one of the gear regulation marks 3223 on the second pivoting member 62 aligns with the peephole 23. For example, as shown in FIG. 22, the first gear of the gear regulation marks 3223 is in alignment with the peephole 23 as the seat shell 20 is configured to the most reclining position, and, as shown in FIG. 23, the second gear of the gear regulation marks 3223 is in alignment with the peephole 23 as the seat shell 20 is configured to the transitional position, and, as shown in FIG. 24, the third gear of the gear regulation marks 3223 is in alignment with the peephole 23 as the seat shell 20 is configured to the most upright position.

Along with the figures, switching of the seat shell 20 of the child car seat 100 among the most reclining position, the transitional opposition, and the most upright position is described below. When the seat shell 20 is to be converted from the most reclining position shown in FIG. 22, FIG. 25, or FIG. 28 to the transitional position shown in FIG. 23, or FIG. 26, a user manipulates the backrest actuator 20g to disengage the locking pin 20i from a right most locking hole 211 on the holder 20a so that the backrest section 20b and the holder 20a are free to pivot relatively to each other. As the seat shell 20 is configured to the transitional position shown in FIG. 23, or FIG. 26 through the relative pivoting between the backrest section 20b and the holder 20a, the user stops the manipulation of the backrest actuator 20g and the locking pin 20i is engaged with a middle locking hole 211, as shown in FIG. 23 or FIG. 26 for this status. As the seat shell 20 continues to be converted to the status shown in FIG. 24, FIG. 27, or FIG. 29, the user again manipulates the backrest actuator 20g to disengage the locking pin 20i from the middle locking hole 211 on the holder 20a so that the backrest section 20b and the holder 20a are again free to pivot relatively to each other. When the seat shell 20 is configured to the most upright position shown in FIG. 24, FIG. 27, or FIG. 29 through the relative pivoting between the backrest section 20b and the holder 20a, the user stops the manipulation of the backrest actuator 20g and the locking pin 20i is engaged with a left-most locking hole 211, as shown in FIG. 27 or FIG. 29. In the process of converting the seat shell 20 from the most reclining position to the most upright position, the first gear mark of the gear regulation marks 3223 aligns with the peephole 23 (as shown in FIG. 22) when the seat shell 20 is at the most reclining position as the third guide post 293a is at the right end of the third guide slot 293b (as shown in FIG. 25), where the first elastic component 43 is under compression and the first guide post 291a is at the upper end of the first guide slot 291b so that the blocker 41 is pushed by the linking assembly 32' and laid across the safety belt guiding passage 45 to block the opening 45a. The second gear mark of the gear regulation marks 3223 will be in alignment with the peephole 23 (as shown in FIG. 23) when the seat shell 20 is configured to the transitional position as the third guide post 293a has slid to the middle of the third guide slot 293b (as shown in FIG. 26), while in the meantime the first elastic component 43 is still under compression and the first guide post 291a has slid to the middle of the first guide slot 291b to keep the blocker 41 laid across the safety belt passage 45 since the linking assembly 23' on the first guide post 291a still abuts against the bearing portion 411 of the blocker 41. The third gear mark of the gear regulation marks 3223 will be in alignment with the peephole 23 (as shown in FIG. 24) when the seat shell 20 is configured to the most upright position as the third guide post 293a has slid to the middle of the third guide slot 293b (as shown in FIG. 27), while in the meantime the first elastic component 43 is released from compression so that the linking assembly 32' abuts against the inclined transitional portion 412 of the blocker 41 to keep the blocker 41 away from the safety belt guiding passage 45 and the first guide post 291a has slid to the lower end of the first guide slot 291b (as shown in FIG. 24).

Compared with prior arts, the safety belt guiding apparatus 30 in the invention includes the safety belt director 40, the linking assembly 32' assembled to the holder 20a or the backrest section 20b and linked with the blocker 41, and the safety belt guiding passage 45 disposed to the holder 20a and threaded by the safety belt of the car, where an opening 45a is formed at the safety belt guiding passage 45. Given such structure, when the seat shell 20 varies among various using positions, the backrest section 20b or the seat section 20c selectively drives, through the linking assembly 32', the blocker 41 to block or unblock the opening 45a so that the safety belt is able to enter the safety belt guiding passage 45 through the unblocked opening 45a to fasten the stand-alone seat shell 20 or the seat shell 20 incorporated with the base 10 to the car seat. Hence, in the above ways, the using modes of the child car seat 100 may be provided with versatility and agility. Furthermore, whether the blocker 41 blocks or unblocks the opening 45a of the safety belt guiding passage 45 is controlled by the regulation of the relative pivoting between the backrest section 20b and the seat section 20c, that is, the blocker 41 complies with the relative pivoting between the backrest section 20b and the seat section 20c to block or un block the opening 45a, which simplifies the manipulation and the structure of the safety belt guiding apparatus of the invention.

Please be noted that, in other embodiments, the child car seat 100 may simply include the seat shell 20 and the safety belt director 40 mentioned above and is still fully functional. Similarly, in other embodiments, the seat shell 20 may be adapted to only include the holder 20a and the backrest section 20b movably disposed to the holder 20a, where the three using positions of the seat shell 20 may correspondingly be realized by the relative movements between the backrest section 20b and the holder 20a. For the seat shell 20 coming without the seat section 20c, the seat shell 20 of the embodiments may simply include the corresponding first guiding structure 291 and second guiding structure 292, and the implementation is not limited by the above embodiments.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt guiding apparatus disposed at a child car seat, the child car seat at least comprising a seat shell, the seat shell comprising a holder, and a backrest section and a seat section movably mounted to the holder, the seat section and the backrest section pivoted to each other where the seat shell is configurable to at least two using positions due to relative pivoting between the seat section and the backrest section, the safety belt guiding apparatus comprising:

a safety belt director and a linking assembly assembled to the holder, one end of the linking assembly linked with the backrest section or the seat section, another end of the linking assembly linked with the safety belt director;

wherein when the seat shell varies among various using positions, the backrest section or the seat section selectively drives, through the linking assembly, the safety belt director to move to a first position or a second position with respect to the holder, and a seat belt selectively passing through the safety belt director at the first position fastens the stand-alone seat shell or the seat shell assembled with a base to a car seat.

2. The safety belt guiding apparatus of claim 1, wherein the safety belt director pops out of the holder to the first position when the seat shell is configured to a most upright using position and the safety belt director retracts to the holder to the second position when the seat shell is configured to any of the using positions other than the most upright using position.

3. The safety belt guiding apparatus of claim 1, wherein a guiding structure, linked with the linking assembly and guiding the relative pivoting between the seat section and the backrest section, is disposed between the holder and at least one of the seat section and the backrest section, the backrest section or the seat section selectively driving, through the linking assembly, the safety belt director to pop out of the holder to the first position or to retract to the holder to the second position.

4. The safety belt guiding apparatus of claim 3, wherein the guiding structure comprises a guide slot and a guide post, the guide slot positioned at a side wall of the holder and the guide post positioned at a side wall of the seat section, the side wall of the seat section facing the side wall of the holder, the linking assembly linked with the guide post, the guide post sliding along the guide slot during the process of relative pivoting between the seat section and the backrest section.

5. The safety belt guiding apparatus of claim 4, wherein the linking assembly comprises a linking member, pivoted to the holder, and a driving member, movably disposed to the holder and selectively driving the safety belt director to pop out of the holder to the first position, one end of the linking member linked with the guide post and another end of the linking member linked with the driving member.

6. The safety belt guiding apparatus of claim 5, wherein the driving member comprises a pushing section adapted to push against the safety belt director to pop out of the holder during a process of the driving member moving relatively to the holder, a popped-out direction of the safety belt director intersecting a sliding direction of the driving member.

7. The safety belt guiding apparatus of claim 6, wherein the pushing section comprises a pushing bevel inclined outward along a direction where the driving member slides near the safety belt director.

8. The safety belt guiding apparatus of claim 5, further comprising a resilient restoring component linked between the safety belt director and the holder, the resilient restoring component bearing a potential to drive the popped-out safety belt director at the first position to retract to the holder to the second position.

9. The safety belt guiding apparatus of claim 5, wherein the driving member comprises gear regulating marks respectively corresponding to one of the using positions of the seat shell and the holder comprises a peephole aligning with one of the gear regulating marks.

10. The safety belt guiding apparatus of claim 1, wherein the safety belt director comprises a blocker movably disposed to the holder and a safety belt guiding passage disposed to the holder and threaded by the seat belt, an opening formed at the safety belt guiding passage for the seat belt to pass therethrough, the linking assembly disposed to the backrest section or the seat section and linked with the blocker, the blocker driven by the backrest section or the seat section via the linking assembly to selectively shift between the first position and the second position when the seat shell varies among various using positions; wherein when driven to shift to the first position, the blocker unblocks the opening; wherein when driven to shift to the second position, the blocker blocks the opening.

11. The safety belt guiding apparatus of claim 10, wherein the blocker moving to the second position is laid across the safety belt guiding passage to block the opening when popping out of the holder, wherein the blocker moving to the first position is removed from the safety belt guiding passage to unblock the opening when retracting into the holder.

12. The safety belt guiding apparatus of claim 10, wherein the blocker moving to the first position is removed from the safety belt guiding passage to unblock the opening when the seat shell is configured to a most upright using position, wherein the blocker moving to the second position is laid across the safety belt guiding passage to block the opening when the seat shell is configured to any of the using positions other than the most upright using position.

13. The safety belt guiding apparatus of claim 10, wherein the blocker comprises a bearing portion and an inclined transitional portion inclined relative to the bearing portion, the blocker driven by the linking assembly to shift to block or unblock the opening as the linking assembly slides between the inclined transitional portion and the bearing portion.

14. The safety belt guiding apparatus of claim 10, further comprising a first elastic component bearing constant potential of driving the blocker to block the opening or to unblock the opening.

15. The safety belt guiding apparatus of claim 10, wherein a first guiding structure guiding the relative pivoting between the seat section and the backrest section is disposed between the holder and at least one of the seat section and the backrest section, the linking assembly formed on the first guiding structure.

16. The safety belt guiding apparatus of claim 15, wherein the first guiding structure comprises a first guide slot and a first guide post, the first guide slot positioned on a side wall of the holder, the first guide post positioned on a side wall of at least one of the seat section and the backrest section and sliding along the first guide slot, the linking assembly positioned on the first guide post, the side wall of at least one of the seat section and the backrest section facing the side wall of the holder.

17. The safety belt guiding apparatus of claim 16, wherein a second elastic component is linked between the side wall of the holder and one of the linking assembly and the first guiding structure.

18. The safety belt guiding apparatus of claim 10, wherein a second guiding structure guiding the relative pivoting between the seat section and the backrest section is disposed between the holder and at least one of the seat section and the backrest section.

19. The safety belt guiding apparatus of claim 10, wherein a third guiding structure guiding the relative pivoting between the seat section and the backrest section is disposed between the holder and at least one of the seat section and the backrest section, a gear regulation marks structure disposed on the side wall of the holder and linked with the third guiding structure, the gear regulation marks structure respectively corresponding to the using positions of the seat shell.

20. A child car seat, comprising:
at least a seat shell, the seat shell comprising a holder, and a backrest section and a seat section movably mounted to the holder, the seat section and the backrest section pivoted to each other where the seat shell is configurable to at least two using positions due to relative pivoting between the seat section and the backrest section; and
a safety belt guiding apparatus comprising a safety belt director and a linking assembly assembled to the holder, one end of the linking assembly linked with the backrest section or the seat section, another end of the linking assembly linked with the safety belt director;
wherein when the seat shell varies among various using positions, the backrest section or the seat section selectively drives, through the linking assembly, the safety belt director to move to a first position or a second position with respect to the holder, and a seat belt selectively passing through the safety belt director at the first position fastens the stand-alone seat shell or the seat shell assembled with a base to a car seat.

21. The child car seat of claim 20, wherein the safety belt director pops out of the holder to the first position when the seat shell is configured to a most upright using position and the safety belt director retracts to the holder to the second position when the seat shell is configured to any of the using positions other than the most upright using position.

22. The child car seat of claim 21, wherein a guiding structure, linked with the linking assembly and guiding the relative pivoting between the seat section and the backrest section, is disposed between the holder and at least one of the seat section and the backrest section, the backrest section or the seat section selectively driving, through the linking assembly, the safety belt director to pop out of the holder to the first position or to retract to the holder to the second position.

23. The child car seat of claim 22, wherein the guiding structure comprises a guide slot and a guide post, the guide slot positioned at a side wall of the holder and the guide post positioned at a side wall of the seat section, the side wall of the seat section facing the side wall of the holder, the linking assembly linked with the guide post, the guide post sliding along the guide slot during the process of relative pivoting between the seat section and the backrest section.

24. The child car seat of claim 23, wherein the linking assembly comprises a linking member, pivoted to the holder, and a driving member, movably disposed to the holder and selectively driving the safety belt director to pop out of the holder to the first position, one end of the linking member linked with the guide post and another end of the linking member linked with the driving member.

25. The child car seat of claim 24, wherein the driving member comprises a pushing section adapted to push against the safety belt director to pop out of the holder to the first position during the process of the driving member sliding relatively to the holder, a popped-out direction of the safety belt director intersecting a sliding direction of the driving member.

26. The child car seat of claim 25, wherein the pushing section comprises a pushing bevel inclined outward along a direction where the driving member slides near the safety belt director.

27. The child car seat of claim 24, further comprising a resilient restoring component linked between the safety belt director and the holder, the resilient restoring component bearing the potential to drive the popped-out safety belt director at the first position to retract to the holder to the second position.

28. The child car seat of claim 24, wherein the driving member comprises gear regulating marks respectively corresponding to one of the using positions of the seat shell and the holder comprises a peephole aligning with one of the gear regulating marks.

29. The child car seat of claim 20, wherein the safety belt director comprises a blocker movably disposed to the holder and a safety belt guiding passage disposed to the holder and threaded by the seat belt, an opening formed at the safety belt guiding passage for the seat belt to pass therethrough, the linking assembly disposed to the backrest section or the seat section and linked with the blocker, the blocker driven by the backrest section or the seat section via the linking assembly to selectively shift between the configurations of blocking and unblocking the opening when the seat shell varies among various using positions.

30. The child car seat of claim 29, wherein the blocker moving to the second position is laid across the safety belt guiding passage to block the opening when popping out of the holder, wherein the blocker moving to the first position is removed from the safety belt guiding passage to unblock the opening when retracting into the holder.

31. The child car seat of claim 29, wherein the blocker moving to the first position is removed from the safety belt guiding passage to unblock the opening when the seat shell is configured to a most upright using position, wherein the blocker moving to the second position is laid across the safety belt guiding passage to block the opening when the seat shell is configured to any of the using positions other than the most upright using position.

32. The child car seat of claim 29, wherein the blocker comprises a bearing portion and an inclined transitional portion inclined relative to the bearing portion, the blocker driven by the linking assembly to shift between the configurations of blocking and unblocking the opening as the linking assembly slides between the inclined transitional portion and the bearing portion.

33. The child car seat of claim 29, further comprising a first elastic component bearing constant potential of driving the blocker to block the opening or to unblock the opening.

34. The child car seat of claim 29, wherein a first guiding structure guiding the relative pivoting between the seat section and the backrest section is disposed between the holder and at least one of the seat section and the backrest section, the linking assembly formed on the first guiding structure.

35. The child car seat of claim 34, wherein the first guiding structure comprises a first guide slot and a first guide post, the first guide slot positioned on a side wall of the holder, the first guide post positioned on a side wall of at least one of the seat section and the backrest section and sliding along the first guide slot, the linking assembly positioned on the first guide post, the side wall of at least one of the seat section and the backrest section facing the side wall of the holder.

36. The child car seat of claim 35, wherein a second elastic component is linked between the side wall of the holder and one of the linking assembly and the first guiding structure.

37. The child car seat of claim 29, wherein a second guiding structure guiding the relative pivoting between the seat section and the backrest section is disposed between the holder and at least one of the seat section and the backrest section.

38. The child car seat of claim 29, wherein a third guiding structure guiding the relative pivoting between the seat section and the backrest section is disposed between the holder and at least one of the seat section and the backrest section, a gear regulation marks structure disposed on the side wall of the holder and linked with the third guiding structure, the gear regulation marks structure respectively corresponding to the using positions of the seat shell.

* * * * *